United States Patent [19]

Guichard et al.

[11] Patent Number: 4,841,464

[45] Date of Patent: Jun. 20, 1989

[54] CIRCUIT FOR THE FAST CALCULATION OF THE DIRECT OR INVERSE COSINE TRANSFORM OF A DISCRETE SIGNAL

[76] Inventors: Jacques Guichard, 8 rue des Morillons, 75015 Paris; Eric Cassimatis, 4 pl de Barcelone, 75016 Paris, both of France

[21] Appl. No.: 865,108

[22] Filed: May 20, 1986

[30] Foreign Application Priority Data

May 22, 1985 [FR] France ............................ 85 07717

[51] Int. Cl.$^4$ .............................................. G06F 7/38
[52] U.S. Cl. ................................................. 364/725
[58] Field of Search .......................... 364/725–727, 364/754, 768

[56] References Cited

U.S. PATENT DOCUMENTS

| | | | |
|---|---|---|---|
| 4,449,194 | 5/1984 | Wilhelm | 364/725 |
| 4,675,836 | 6/1987 | Arnould et al. | 364/725 |
| 4,679,163 | 7/1987 | Arnould et al. | 364/725 |

OTHER PUBLICATIONS

N. Ahmed et al., "Discrete Cosine Transform", IEEE Trans. on Computers, Jan. 1974, pp. 90–93.
R. Haralick, "A Storage Efficient Way to Implement the Discrete Cosine Transform", IEEE Trans. on Computers, Jul. 1976, pp. 764–765.
W. Chen et al., "A Fast Computational Algorithm for the Discrete Cosine Transform", IEEE Trans. on Communications, vol. COM-25, No. 9, Sep. 1977, pp. 1004–1009.
B. Tseng et al., "On Computing the Discrete Cosine Transform", IEEE TRans. on Computers, vol. C-27, No. 10, Oct. 1978, pp. 966–968.
A. Jalali et al., "A High-Speed FDCT Processor for Real-Time Processing of NTSC Color TV Signal", IEEE Trans. on Electromagnetic compatibility, vol. EM-C-24, No. 2, May 1982, pp. 278–286.
F. Kamangar et al., "Fast Algorithm for the 2-D Discrete Cosine Transform", IEEE Trans. on Computers, vol. C-31, No. 9, Sep. 1982, pp. 899–906.
M. Haque, "A Two-Dimensional Fast Cosine Transform", IEEE Trans. on Acoustics, Speech, and Signal Processing, vol. ASSP-33, No. 6, Dec. 1985, pp. 1532–1539.

Primary Examiner—Gary V. Harkcom
Assistant Examiner—Long Thanh Nguyen
Attorney, Agent, or Firm—Nutter, McClennen & Fish

[57] ABSTRACT

A circuit for the fast calculation of the discrete cosine transform $(X_i)$, $0 \leq i \leq N-1$, in which $N = 2^n$ and n is an integer of a signal defined by a sequence $(x_i)$, $0 \leq i \leq N-1$ includes a first adder stage receiving the sequence $(x_i)$, $0 \leq i \leq N-1$, and supplying two sequences $(x_i^o)$ and $y_i^f$) and $0 \leq i \leq (N/2) - 1$, a group of upper half-stages receiving the sequence of $x^o{}_i$) and supplying the sequence $(X_{2q})$ of the even components of the cosine transform. That group constitutes a circuit for the fast calculation of the cosine transform for a group of (N/2) points and a group of lower half-stages receiving the sequence $(y_i)$ and supplying the sequence $(X_{2q+1})$ of the odd components of the cosine transform.

13 Claims, 12 Drawing Sheets

| n | $N=2^n$ | CHEN | | | INV. | | |
|---|---|---|---|---|---|---|---|
| | | $\otimes$ | $\oplus$ | E | $\otimes$ | $\oplus$ | E |
| 2 | 4 | 1 | 1 | 2 | 1 | 1 | 2 |
| 3 | 8 | 2 | 2 | 4 | 2 | 2 | 4 |
| 4 | 16 | 3 | 3 | 6 | 2 | 3 | 5 |
| 5 | 32 | 4 | 4 | 8 | 3 | 4 | 7 |
| 6 | 64 | 5 | 5 | 10 | 3 | 5 | 8 |

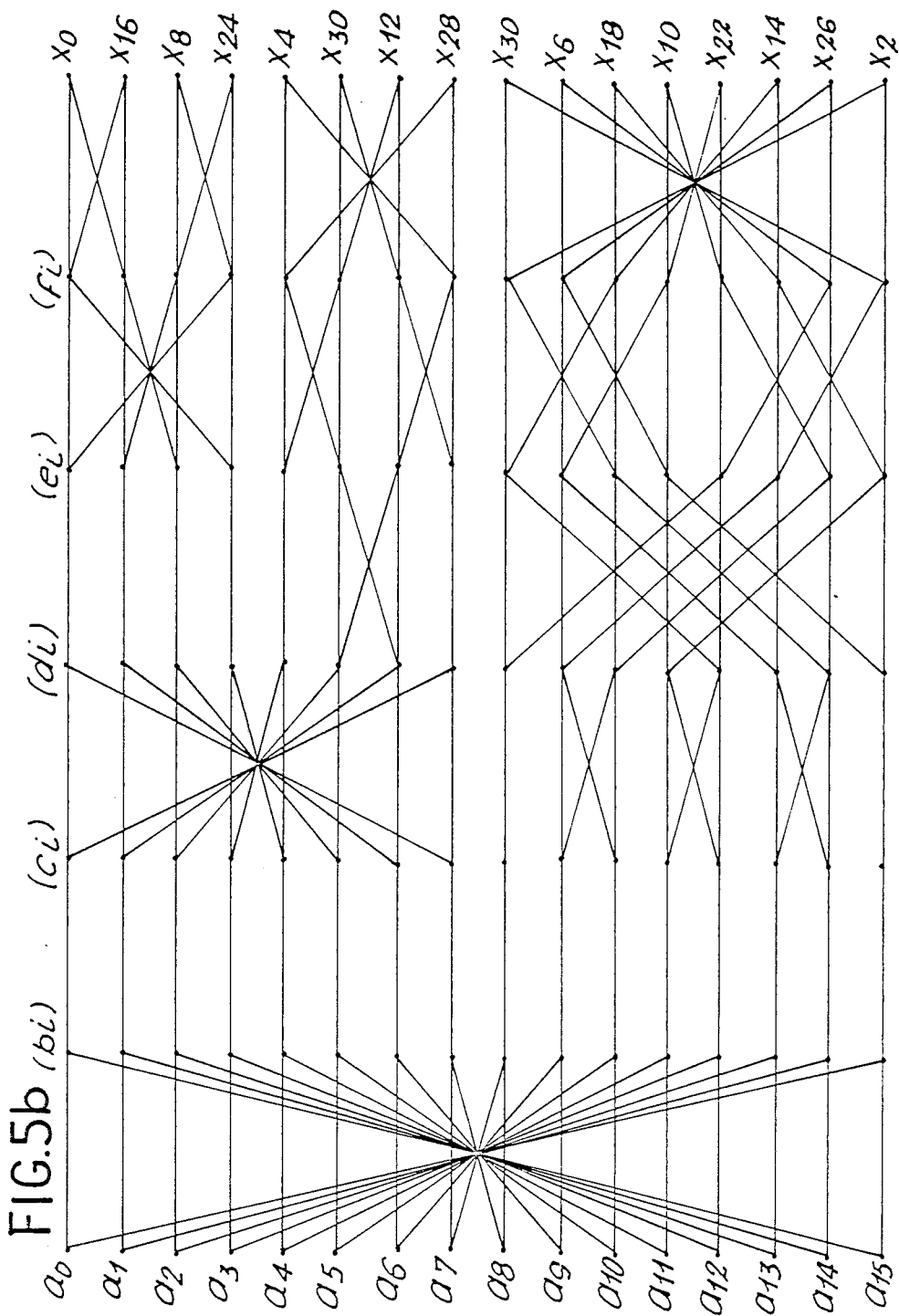

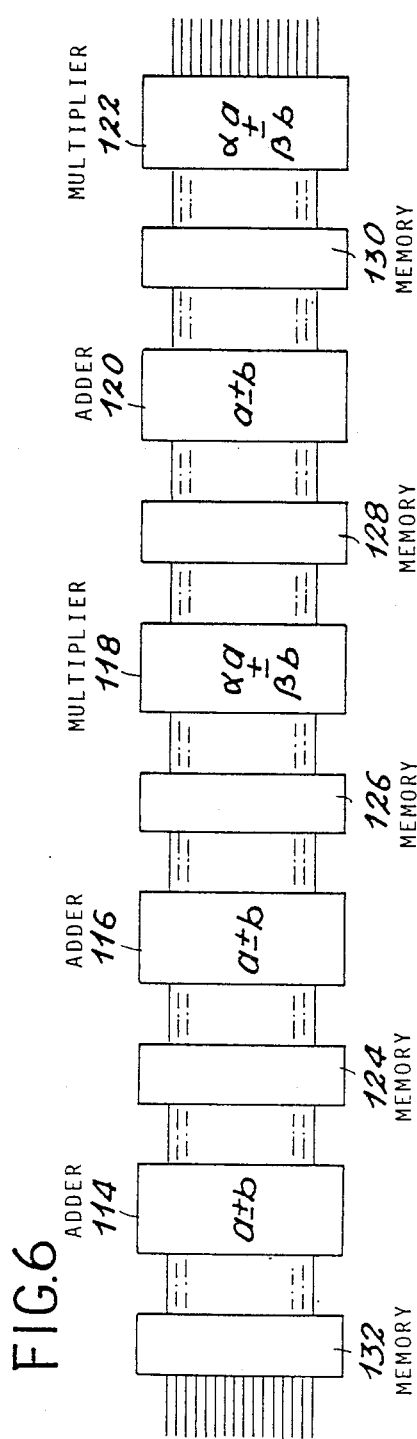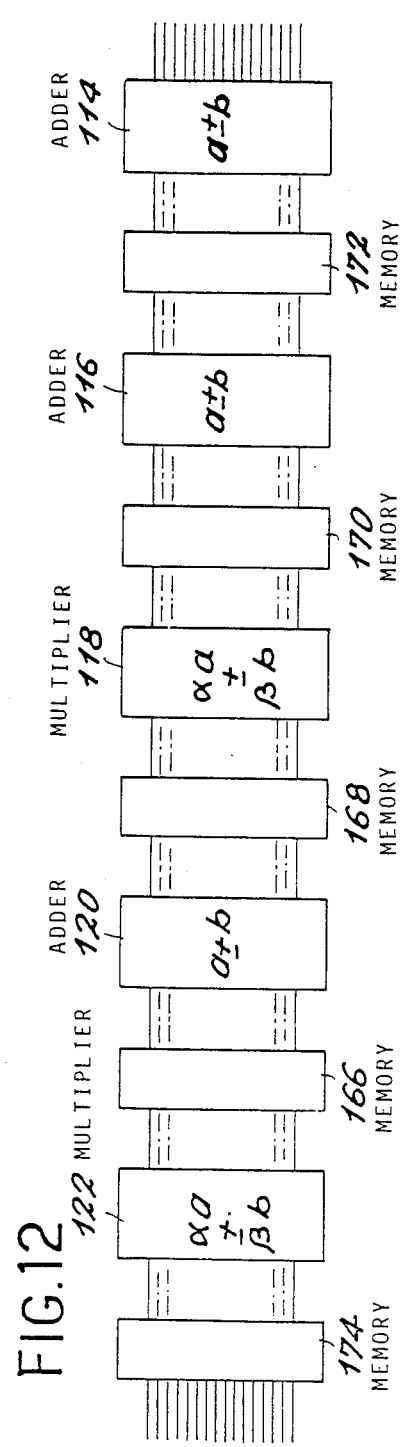

CIRCUIT FOR THE FAST CALCULATION OF THE DIRECT OR INVERSE COSINE TRANSFORM OF A DISCRETE SIGNAL

BACKGROUND OF THE INVENTION

The present invention relates to a circuit for the fast calculation of the direct cosine transform of a discrete signal and a circuit for the fast calculation of the inverse cosine transform of a discrete signal. These transforms are more particularly used in the processing of signals of digital images or pictures and particularly for the coding and decoding of high resolution images or pictures. The invention relates to the reverse or direct discrete cosine transforms in which the signal to be processed is represented by N points, N being in the form $2^n$, in which n is an integer.

In general terms, the cosine transform of a sequence $(x_i), 0 \leq i \leq N-1$, representing the discretized signal to be processed in a sequence $(X_i), 0 \leq i \leq N-1$ is obtained by a sequence of operators, each operator receiving from the preceding operator a group of N points and supplying to the following operator a sequence of N points obtained from the points received at the input by simple mathematical operations. These mathematical operations are essentially additions and multiplications, to which a permutation may optionally be added.

In the present invention, the cosine transform calculating circuit comprises a sequence of stages, each stage realising an operator and leading to the appearance of N intermediate numbers, each being a linear combination of at the most two numbers from the preceding stage. Each operator can be mathematically represented by a matrix of size $N \times N$. The cosine transform circuit is then defined by a product of matrixes. In the case where said matrixes are orthogonal, they are easily invertible. Thus, their inverse is equal, optionally to within a multiplication factor, to their transpose. The inverse cosine transform circuit is then defined by the product of the transposed matrixes, taken in the reverse order of that of the product of the matrixes of the direct transform.

In the circuit according to the invention, the matrixes of the direct transform are not orthogonal. However, the product of each matrix by its transpose is a diagonal matrix and it is found that the inverse transform is defined by the product of said transposed matrixes, performed in the reverse order of the product of the matrixes of the direct transform, multiplied by a coefficient equal to (2/N). The circuit of the reverse transform is thus simply obtained by reversing the order of the stages of the direct transform circuit, the coefficient (2/N) being either included in one of the multiplier stages of the direct transform or is obtained by means of a supplementary multiplier stage.

An adder stage of form $a \pm b$ defines the value of an output point as the sum or difference of the values of two input points. A multiplier stage of form $\alpha.a \pm \beta.b$ associates with each output point the sum or difference of the value of two input points allocated with predetermined coefficients $\alpha$ and $\beta$. This stage can be provided with means for exchanging the coefficients $\alpha$ and $\beta$, so as to produce $\alpha a \pm \beta b$ or $\beta a \pm \alpha b$.

The operator of one stage may not apply to all the input points. The value of certain output points is then simply equal to the value of one input point or to its opposite. Such an operator is said to have a transparent state. Texas Instruments circuit 74181 is an example of an adder-subtracter with a transparent state.

At a practical level, an adder stage comprises at least one adder-subtracter. A multiplier stage is more complex, because it requires at least one multiplier with accumulator or a multiplier with an adder-subtracter. These circuits must be fast for the real time processing of image signals, such as video signals and these circuits are onerous.

The number of adders-substracters and multipliers in a circuit for the fast calculation of the cosine transform is consequently a particularly important criterion in the field of the invention. It should also be noted that the cost of a multiplier is much higher than the cost of an adder and that the reduction in the number of multiplier stages in the circuit is particularly desired.

The article "A fast computational algorithm for the discrete cosine transform" by W. H. CHEN, which appeared in IEEE Transactions on Communications, Vol 25, No 9, September 1977, pp 1004 to 1009 discloses a process for the fast calculation of the cosine transform. In this article, the process for the fast calculation of the cosine transform is defined by a matrix $[A_N]$ equal to a product of matrixes of size $N \times N$. Each matrix represents an operator and corresponds to one stage of the circuit. The matrix $[A_N]$ is equal to:

$$[P_N] \cdot \begin{bmatrix} A_{N/2} & 0 \\ 0 & R_{N/2} \end{bmatrix} \cdot [B_N]$$

in which $[P_N]$ is a permutation matrix $N \times N$, the block $[A_{N/2}]$ is the matrix corresponding to the cosine transform of a group of N/2 points, the block $[R_{N/2}]$ is a product of $2n-3$ matrixes, in which $n = \log_2 N$ and $[B_N]$ is a matrix, whose terms located on the two diagonals are equal to $\pm 1$, the other terms being zero.

The $2n-3$ matrixes are broken down into $n-1$ multiplier matrixes and $n-2$ adder matrixes. The adder matrixes are those in which the non-zero coefficients are equal to $\pm 1$. The multiplier matrixes have sine or cosine terms. The cosine transform circuit described in this article thus comprises $n-1$ multiplier stages and $n-1$ adder stages, whilst taking account of the stage corresponding to the matrix $[B_N]$. Account is not taken of the stage or the permutation matrix $P_N$, which does not constitute a real calculation.

The known circuit for the fast calculation of the cosine transform described hereinbefore has been slightly modified to permit pipeline processing. These modifications essentially comprise delaying by one or more stages the calculation performed on certain points of the group of N processed points and of providing operators with four inputs. This permits the parallel operation of all the stages of the circuit performing the process.

Reference should be made to the article "A high speed FDCT processor for real-time processing of NTSC colour TV signal", By A. JALALI and K. R. RAO, which appeared in IEEE Transactions on Electromagnetic Compatibility, Vol 24, No 2, May 1982, pp 278 to 286 for a more detailed description of this circuit.

SUMMARY OF THE INVENTION

The invention relates to a circuit for the fast calculation of the cosine transform having a smaller number of stages than in known circuits. The stage gain in the circuit according to the invention mainly relates to the multiplier stages, which is important from the economic standpoint because, as was stressed hereinbefore, the cost of a multiplier is particularly high.

The gain of a stage is reached for $n \geq 32$, in which $N=2^n$ and n is an integer.

The invention also relates to a circuit for the fast calculation of the cosine transform in which the stages, accept a first adder stage, are constituted by two independent half-stages, called the upper half-stage and lower half-stage, the sequence of upper half-stages making it possible to calculate components of even index of the cosine transform and the lower half-stages permitting the calculation of the components of odd index of the cosine transform. The term independent half-stages is understood to mean that a signal supplied e.g. by an upper half-stage is only dependent on the signals received from said upper half-stage. This structure has the advantage of forming a circuit for the fast calculation of the cosine transform of size N from a circuit for the fast calculation of the cosine transform of size $(N/2)$ and consequently by recurrence makes it possible to obtain a circuit for a random size N. More specifically, the present invention relates to a circuit for the fast calculation of the cosine transform $(X_i)$, $0 \leq i \leq N-1$, in which $N=2^n$, $n \geq 4$ of a discretized signal defined by a sequence $(x_i)$, $0 \leq i \leq N-1$, wherein it comprises: a first adder stage receiving the sequence $(x_j)$, $0 \leq j \leq N-1$, and supplying a first sequence $(x_j^o)$, $0 \leq j \leq (N/2)-1$, in which $x_j^o = x_j + x_{N-1-j}$ and a second sequence $(Y_j)$, $0 \leq j \leq (N/2)-1$, in which $y_j = x_j - x_{N-1-j}$; a group of upper half-stages connected in series, the first upper-half-stage receiving the first sequence $(x_j^o)$, $0 \leq j \leq (N/2)-1$, and the last upper half-stage supplying the sequence $(X_{2q})$, $0 \leq q \leq (N/2)-1$, of the even index components of the cosine transform, the signal supplied on each output of each half-stage being obtained by linear combination of at the most two signals applied to each of its inputs, said group of upper half-stages being defined by recurrence on the size N, said group of upper half-stages constituting a cosine transform circuit for $N/2$ points, said circuit comprising in series, for $N=8$, and adder stage, a multiplier stage, an adder stage and a multiplier stage;

a group of lower half-stages connected in series, the first lower half-stage receiving the second sequence $(y_j)$, $0 \leq j \leq (N/2)-1$, and the final lower half-stage supplying the sequence $(X_{2q+1})$, $0 \leq q \leq (N/2)-1$, of odd index components of the cosine transform, the signal supplied on each output of each half-stage being obtained by linear combination of at the most two signals applied to each of its inputs, the group of lower half-stages comprising in series:

(a) a first lower adder half-stage supplying a third sequence $(x_j^3)$, $0 \leq j \leq (N/8)-1$, in which $x_j^3 = y_{4j+2} + y_{4j+1}$, a fourth sequence $(x_j^1)$, $0 \leq j \leq (N/4)-1$, in which $x_j^1 = y_{4j}$ for $j \leq (N/8)-1$ and $x_j^1 = -y_{N-4j-1}$ for $j \geq N/8-1$, and a fifth sequence $(x_j^2)$, $0 \leq j \leq (N/8)-1$ in which $x_j^2 = y_{4j+2} - y_{4j+1}$ (b) a sequence of lower adder or multiplier half-stages supplying a sixth sequence $(\alpha_{2q+1})$, $0 \leq q \leq (N/8)-1$, equal to the real parts of the odd index components of the Fourier transform of order $(N/2)$ of the fourth sequence, a seventh sequence $(\beta_{2q+1})$, $0 \leq q \leq (N/8)-1$ equal to the imaginary parts of the odd index components of the Fourier transform of order $(N/2)$ of the fourth sequence, an eighth sequence $(\delta_{2q+1})$, $0 \leq q \leq (N/8)-1$ equal to the odd index components of the sine transform of order $(N/4)$ of the fifth sequence, a ninth sequence $(\gamma_{2q+1})$, $0 \leq q \leq (N/8)-1$) equal to the odd index components of the cosine transform of order $(N/4)$ of the third sequence, (c) a second lower adder half-stage for supplying the sequences $(\alpha_{2q+1} + \gamma_{2q+1})$, $0 \leq q \leq (N/8)-1$, $(\alpha_{2q+1} - \gamma_{2q+1})$, $0 \leq q \leq (N/8)-1$, $(\beta_{2q+1} + \delta_{2q+1})$, $0 < q < (N/8)-1$, and $(\beta_{2q+1} - \delta_{q+1})$, $0 \leq q \leq (N/8)-1$, (d) and a lower multiplier half-stage supplying the sequence $(X_{2q+1})$, $0 \leq q \leq (N/2)-1$, of odd index components of the cosine transform of order N of the sequence $(x_j)$, $0 \leq j \leq N-1$.

In a preferred manner, the groups of upper and lower half-stages have an identical number of adder half-stages.

In a preferred manner, the group of upper half-stages and the group of lower half-stages have an identical number of multiplier half-stages, some of the multiplier half-stages being optionally equal to the identity operation.

In a preferred manner, an upper half stage of given rank and a lower half-stage of the same rank are of the same type, i.e. both are adder stages or both are multiplier stages.

In a preferred manner, the sequence of lower half-stages supplying the sixth sequence equal to the real parts of the odd index components of the Fourier transform of order $(N/2)$ of the fourth sequence consists of adder and multiplier stages, whose number, order and type are those of a cosine transform circuit for a sequence of $(N/4)$ points, said circuit having for $N=4$ an adder stage and a multiplier stage.

In a preferred manner, each group of half stages comprises $n-2$ adder half-stages and $$E\left(\frac{n+1}{2}\right)$$

multiplier half-stages, in which E is the integral part function, some of the multiplier half-stages being optionally equal to the identity operation.

The invention also relates to a circuit for the fast calculation of the inverse cosine transform of a discrete signal. This circuit is easily obtained from the direct transform circuit. Thus, the sequence of stages of the direct transform circuit, taken in the order opposite to that of the direct transform, constitutes, to within a multiplication factor taken as equal to $(2/N)$, an inverse cosine transform circuit. The demonstration of this property, although causing no mathematical problem, falls outside the scope of the present description. It is based on the fact that the product of the matrix associated with each stage of the direct transform by its transpose is equal to a diagonal matrix. The multiplication coefficient $(2/N)$ can be integrated into one of the multiplier stages of the direct transform. It can also be taken into account in the form of a supplementary multiplier stage, which can e.g. be in the terminal position.

As its structure is identical to that of the direct transform circuit, it is obvious that the inverse transform circuit can be formed by recurrence for successive values of N.

The coefficients of the matrix associated with one stage of the direct transform are generally contained in a read only memory. This memory can only for the corresponding stage of the inverse transform if means are provided for modifying the addressing of the memory in order to interchange the rows and columns of the matrix of coefficients. It might be simpler to replace the read only memory containing the matrix of the direct transform by another read only memory containing the transposed matrix. Thus, the same stage can be used for the direct transform or for the inverse transform by merely changing the read only memory containing the matrix coefficients.

The invention also specifically relates to a circuit for the fast calculation of the inverse cosine transform $(x_j)$, $0 \leq i \leq N-1$ of a discretized signal defined by a sequence $(X_i)$, $0 \leq i \leq N-1$, in which $N=2^n$ and n is number equal to or higher than 4, said circuit comprising a group of n upper half-stages receiving the sequence $(X_{2q})$, $0 \leq q \leq (N/2)-1$ of even index components of the cosine transform and supplying a first sequence $(x_j^0)$, $0 \leq j \leq (N/2)-1$; a group of lower half-stages receiving the sequence $(X_{2q+1})$, $0 \leq q \leq (N/2)-1$ of odd index components of the cosine transform and supplying a second sequence $(x_j^1)$, $0 \leq j \leq (N/2)-1$, and a final adder stage receiving the first sequence $(x_j)$ and the second sequence $(x_j^1)$ and supplying the sequence $(x_j)$, $0 \leq j \leq N-1$, each upper half-stage, each lower half-stage and the final adder stage respectively performing the reverse mathematical operation of that performed by the upper half stage of the same rank, counted in the reverse order, and the first adder stage of the circuit for the fast calculation of the direct cosine transform.

In a preferred manner the circuit for the fast calculation of the direct or inverse transform comprises a memory of at least N storage cells between the first adder stage and the groups of upper and lower half-stages and a memory having at least (N/2) storage cells between each half-stage.

According to another embodiment, the circuit for the fast calculation of the direct or inverse transform comprises a double memory having two series of at least N storage cells between the first adder stage and the groups of upper and lower half-stages and a double memory having two series of at least (N/2) storage cells between each half stage.

These double memories permit a pipeline-type processing, one of the series of (N/2) cells receiving the (N/2) values supplied by the preceding half-stage and the other series of (N/2) cells supplying (N/2) values to the following half-stage. The two series of cells of a double memory operate in the flip-flop type mode, i.e. the (N/2) value supplied by the preceding half stage are alternately directed to one or other of the series.

In a preferred manner, the circuit according to the invention also comprises a memory with N storage cells in front of the first stage.

BRIEF DESCRIPTION OF THE DRAWINGS

The invention is described in greater detail hereinafter relative to non-limitative embodiments and the attached drawings, wherein show:

FIGS. 4b and 4c respectively, trellises producing the even index components and odd index components of the cosine transform according to the trellis of FIG. 4a.

FIGS. 5b and 5c respectively trellises producing the even index components and odd index components of the cosine transform according to the trellis of FIG. 5a.

FIG. 6, a diagrammatic drawing of an embodiment of the circuit according to the invention.

FIG. 12, a diagrammatic drawing of a circuit according to the invention for the fast calculation of the inverse transform corresponding to the trellis of FIG. 10.

DETAILED DESCRIPTION OF THE PREFERRED EMBODIMENTS

Figures 1, 2:
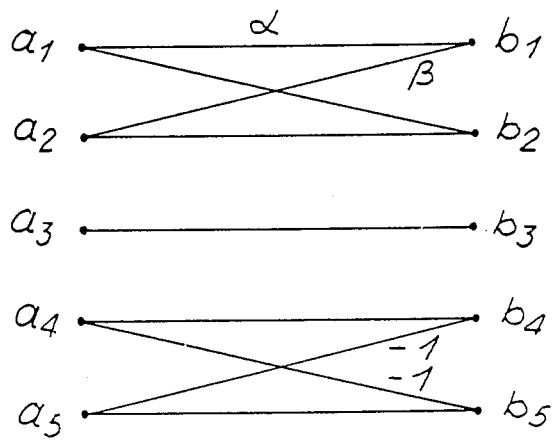
FIG. 1, a table illustrating, for different values of N, the number of adder and multiplier stages in a circuit for the fast calculation of the cosine transform according to the known process of CHEN and according to the process according to the invention.
FIG. 2, a graph providing the conventional representation by a trellis of the addition and multiplication operations.

The table of FIG. 1 indicates, for different values of N, the number of stages of the circuit for the fast calculation of the cosine transform according to the aforementioned article by CHEN and according to the present invention.

For each of these circuit are respectively indicated the number of multiplier stages ⓧ and the number of adder stages ⊕, as well as the total number of stages E.

It can be seen that for n=2 or n=3, the two circuits have the same stages. However, for n≧4, which corresponds to the most frequently used values in practice, the circuit according to the invention has at least one multiplier stage less than the known circuit described in the CHEN article.

In more general terms, the number of multiplier stages is of the order of n in the CHEN circuit and of the order of 3n/4 in the circuit according to the invention. Thus, ther is an approximately 25% gain in multiplier stages, which is considerable.

For N=16, 32, 64, the number of adder stages is identical in both the CHEN and inventive circuits. The number of adder stages in the CHEN circuit is equal to the number of multiplier stages, whilst the number of adder stages in the circuit according to the invention is equal, possibly to within one unit, to the number of multiplier stages, so that there is also an average gain of 25% with respect to adder stages in the circuit according to the invention. This gain is only effective from the value N−128.

A description will now be given of the circuit according to the invention for several values of N using the conventional trellis representation. With reference to FIG. 2, brief details will firstly be given of the notations used in a trellis.

The trellis of FIG. 2 shows an operator with five input points and five output points. At the input, said operator receives 5 values $a_1$, $a_2$, $a_3$, $a_4$ and $a_5$ and supplies at the output five other values $b_1$, $b_2$, $b_3$, $b_4$ and $b_5$. The operator is represented by a group of arcs, each connecting an input point to an output point. To these arcs is allocated a coefficient $\alpha$, $\beta$, $-1$. To simplify the representation, the coefficient is not indicated when it is equal to $+1$. The coefficient associated with an arc is a multiplier coefficient.

The operator of FIG. 2 performs the following operations:

$$b_1 = \alpha\, a_1 + \beta\, a_2$$
$$b_2 = a_1 + a_2,$$
$$b_3 = a_3,$$
$$b_4 = a_4 - a_5,$$
$$b_5 = -a_4 + a_5.$$

An operator is said to be additive or adder if all the coefficients associated with the arcs are equal to $-1$ or $+1$. In the opposite case, the operator is said to be multiplicative or multiplier.

In order to facilitate the reading of the trellises given hereinafter and which illustrate the circuit for the fast calculation of the cosine transform according to the invention, the operations performed in each trellis will firstly be formalized. For this purpose, consideration will firstly be given to a group $(x_i)$, $0 \leq i \leq N-1$, which, processed by the circuit according to the invention, is transformed into a group $(X_i)$, $0 \leq i \leq N-1$, in which the elements $X_i$ are defined in the following way:

$$X_i = \frac{2 \cdot c(i)}{N} \sum_{j=0}^{N-1} x_j \cdot \cos\frac{2\pi(2j+1)i}{4N},\ 0 \leq i \leq N-1$$

in which $c(i)$ is equal to $1/\sqrt{2}$ if $i=0$ and to 1 if $i \neq 0$.

The component $X_i$, in which $0 \leq i \leq N-1$, of the order N discrete cosine transform of a group $(x_j)$, $0 \leq j \leq N-1$, will be designated hereinafter TCD(i, N, x).

The inverse or reverse formula is written $$x_j = \sum_{i=0}^{N-1} c(i) \cdot X_i \cdot \cos\frac{2\pi(2j+1)i}{4N},\ 0 \leq j \leq N-1$$

in which $c(i)$ is equal to $1/\sqrt{2}$ if $i=0$ and to 1 if $i \neq 0$.

The calculation of the component $X_i$ of the discrete cosine transform according to the invention used two different expressions according to the parity of $i$ and these expressions are as follows:

$$X_{2p} = TCD(2p, N, x) = TCD(p, (N/2, x^0)$$

in which $$x^0 = (x_i + x_{N-i-1}),\ 0 \leq i \leq (N/2)-1$$

$$X_{2p+1} = \cos\frac{2\pi(2p+1)}{4N} \cdot$$

-continued $$\left[\cos TFD\left(2p+1, \frac{N}{2}, x^1\right) + TCD\left(2p+1, \frac{N}{4}, x^3\right)\right] -$$

$$\sin\frac{2\pi(2p+1)}{4N} \cdot$$

$$\left[\sin TFD\left(2p+1, \frac{N}{2}, x^1\right) + TSD\left(2p+1, \frac{N}{4}, x^2\right)\right]$$

in which cos TFD($2p+1$, (N/2), $x^1$) and sin TFD($2p+1$, (N/2), $x^1$) respectively designate the real and imaginary parts of the component of index $2p+1$ of the discrete Fourier transform of order (N/2) of the group $x^1$, and in which TSD signifies the discrete sine transform.

The groups $x^1$, $x^2$ and $x^3$ appearing in the expression of the component $X_{2p+1}$ are defined in the following way:

$$y_j = x_j - x_{N-j-1}\ 0 \leq j \leq \frac{N}{2}-1$$

$$x_j^1 = y_{4j}\ \text{if}\ 0 \leq j \leq \frac{N}{8}-1\ \text{and}$$

$$x_j^1 = -y_{N-4j-1}\ \text{and}\ \frac{N}{8} \leq j \leq \frac{N}{4}-1$$

$$x_j^2 = y_{4j+2} - y_{4j+1}\ 0 \leq j \leq \frac{N}{8}-1$$

$$x_j^3 = y_{4j+2} + y_{4j+1}\ 0 \leq j \leq \frac{N}{8}-1$$

The relation $X_{2p} = TCD(p, (N/2), x^0)$ shows that the group of even index components of a cosine transform of a sequence x of size N is equal to the group of components of the cosine transform of a sequence $x^0$ of size (N/2). In other words, for a trellis of size N, the group of even index components of the transform is directly obtained by applying the trellis of size (N/2) to the sequence $x^0$ deduced from the group x.

In the same way, the calculation of the uneven index components $X_{2p+1}$ of a sequence $x_3$ of N points calls on a cosine transform of a sequence $x^3$ of (N/8) points, as well as to the sine transform close to the cosine transform from the structural standpoint.

Thus, the trellis of the cosine transform can be formed by recurrence on N. A description will firstly be given with reference to FIGS. 3a and 3b to the structure of a trellis of size N corresponding to the cosine transform according to the invention using said recurrence. A description will then be given of trellises corresponding to the special cases N=16 and N=32, said trellises serving as a basis for the formation of trellises of greater sizes.

Figure 3A:
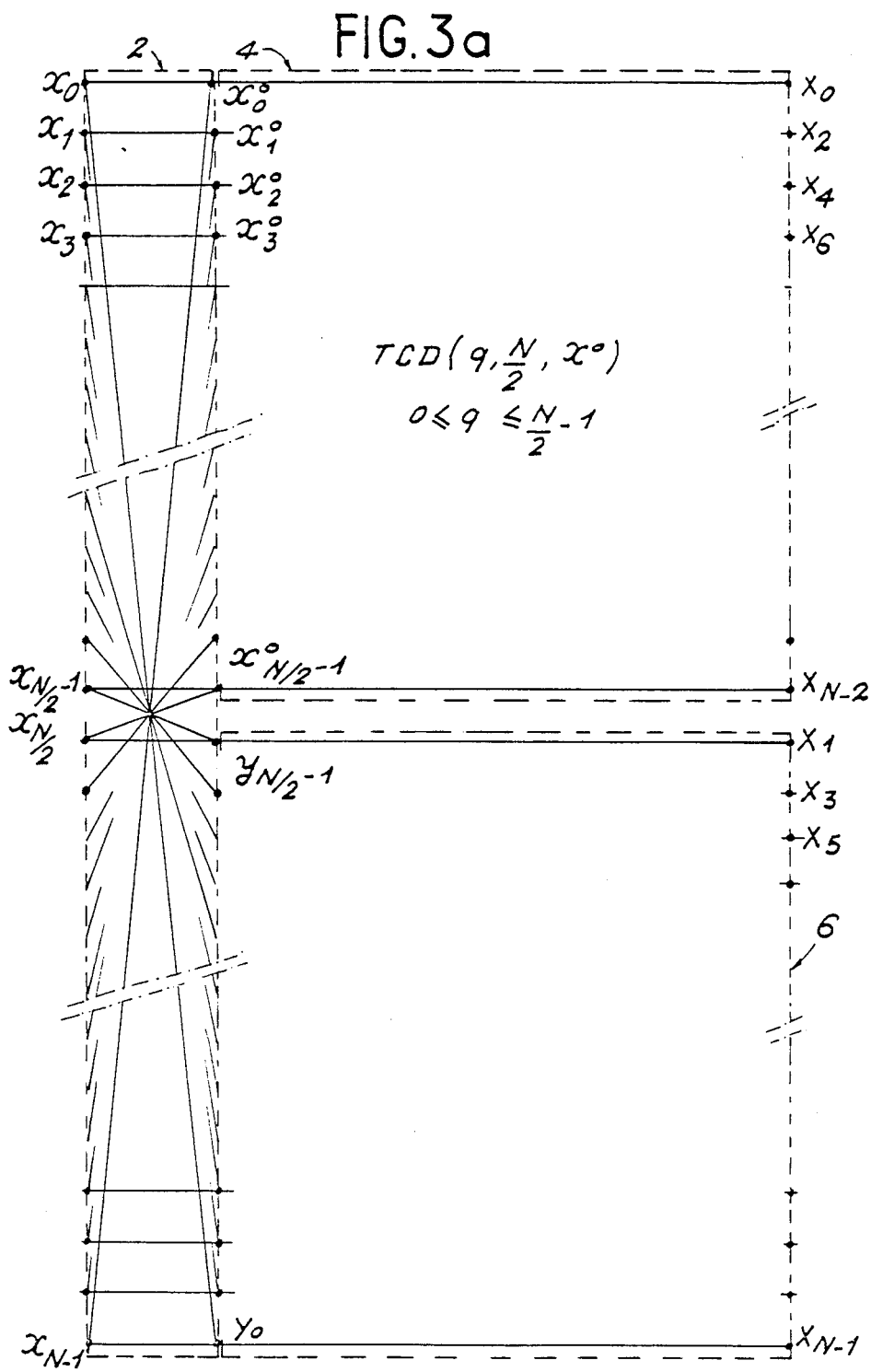
FIG. 3a, diagrammatically the trellis associated with the cosine transform circuit according to the invention illustrating the formation of this trellis by recurrence on the number N of processed signal points.

FIG. 3a diagrammatically shows a trellis corresponding to the calculation of the cosine transform according to the invention of a sequence $(x_i)$, $0 \leq i \leq N-1$ of size N. This trellis is formed from three operations 2, 4 and 6.

Operation 2 is an addition and corresponds to a single stage. It transforms the sequence $(x_j)$, $0 \leq j \leq N-1$ into two sequences $(x_j^0)$, $0 \leq j \leq (N/2)-1$, and $(y_j)$, $0 \leq j \leq (N/2)-1$ according to the equations:

$$x_j^p = x_j + x_{N-1-j}$$

-continued $$y_j = + x_j - x_{N-1-j} \quad 0 \leq j \leq \frac{N}{2} - 1$$

Operations 4 and 6 are parallel, operation 4 producing the sequence ($X_{2q}$, $0 \leq q \leq (N/2)-2$ of the even index components of the cosine transform on the basis of the sequence ($x_j^0$), $0 \leq j \leq (N/2)-1$ and operation 6 producing the sequence ($X_{2q+1}$), $0 \leq q \leq (N/2)-1$ of odd index components of the cosine transform from the sequence ($y_j$), $0 \leq j \leq (N/2)-1$.

Operations 4 and 6 are performed by a group of stages, having in each case N input points and N output points, each output point of each stage receiving a signal obtained by linear combination of at the most two signals received on the input points of said stage.

Each stage behaves like a juxtaposition of two half-stages of the same type, i.e. adder or multiplier, each having (N/2) input points and (N/2) output points. The term upper half-stage is used for that part of a stage associated with operation 4 and the term lower half-stage to that part of a stage associated with operation 6.

Operation 4 is performed by a cosine transform circuit of size (N/2) according to the invention, as can be gathered from the aforementioned expression of the components $X_{2q}$, in which $0 \leq q \leq (N/2)-1$, as a function of the sequence ($x_j^0$) $0 \leq j \leq N-1$: $X_{2q} = \text{TCD}(q, (N/2) x^0)$. By recurrence hypothesis, the structure of this circuit of size (N/2) is assumed to be established.

As is shown by the expression of the components $X_{2q+1}$ in which $0 \leq q \leq (N/2)-1$, of the cosine transform, operation 6 provides quantities such as the cosine transform, the sine transform of size (N/4) and the Fourier transform of size (N/2).

Figure 3B:
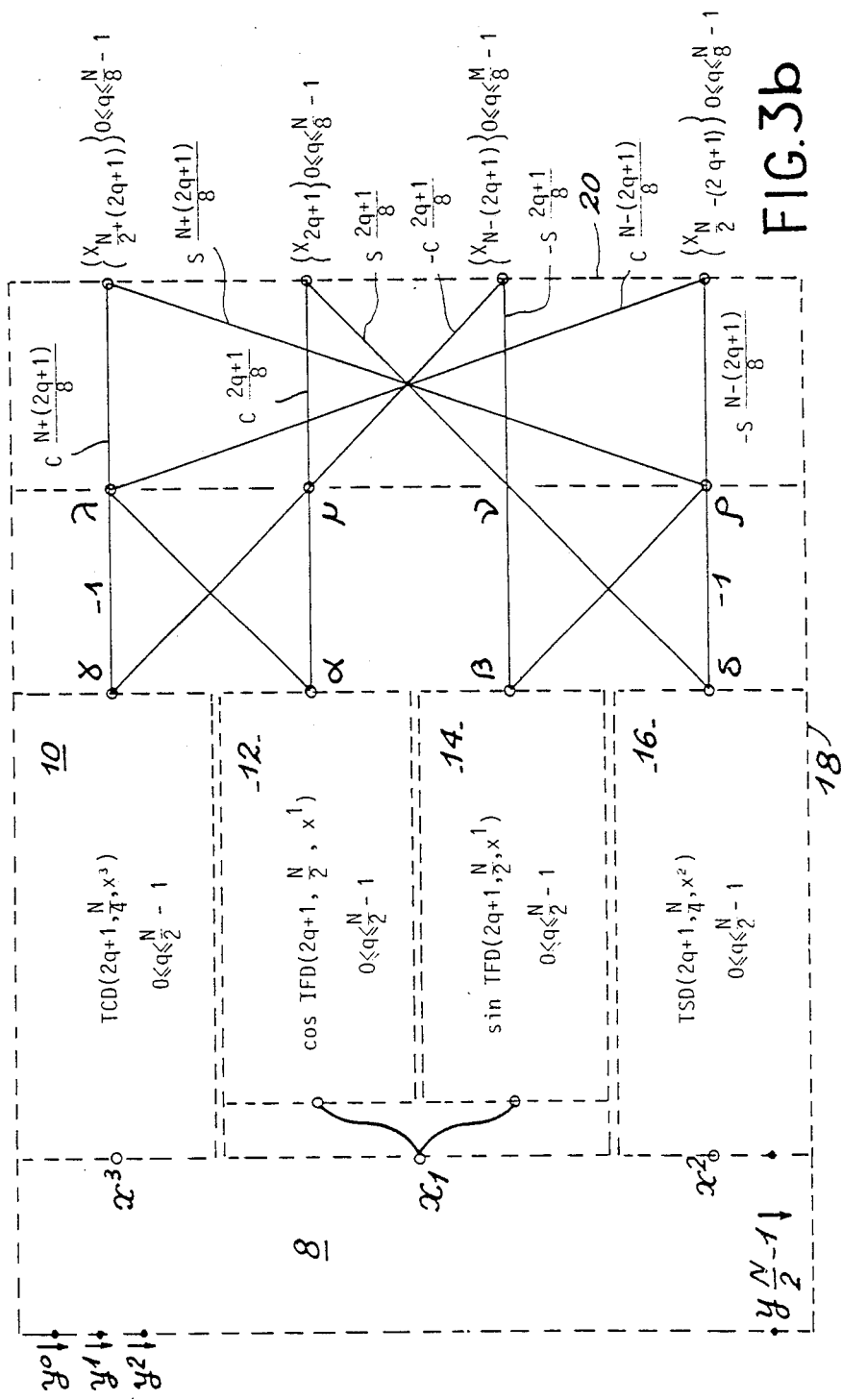
FIG. 3b, the structure of the lower half of the trellis of FIG. 3a producing the odd index components of the cosine transform.

Thus, operation 6 can be broken down into a group of similar operations, as illustrated by FIG. 3b. Operation 6 comprises the following:

(a) an addition operation 8 receiving the sequence ($y_j$), $0 \leq j \leq (N/2)-1$ and supplying three sequences ($x_j^1$), $0 \leq j \leq (N/4)-1$, ($x_j^2$), $0 \leq j \leq (N/8)-1$ and ($x_j^3$), $0 \leq j \leq (N/8)-1$, said sequences being defined by the following relations:

$$x_j^1 = y_{4j} \text{ if } 0 \leq j \leq \frac{N}{8} - 1$$
$$= -y_{N-4j-1} \text{ if } \frac{N}{8} \leq j \leq \frac{N}{4} - 1$$
$$x_j^2 = y_{4j+2} - y_{4j+1}$$
$$x_j^3 = y_{4j+2} + y_{4j+1}$$

(b) an operation 10 receiving the sequence $x^3$ and supplying the components of the cosine transform of order (N/4) of said sequence. Taking account of the symmetries, the (N/2) numbers supplied by this operation, equal to TCD $(2q+1, N/4, X^3)$ for q between 0 and (N/2)−1, amount to (N/8) different numbers designated ($\gamma_{2q+1}$), $0 \leq q \leq (N/8)-1$.

(c) an operation 12 receiving the sequence $x^1$ and supplying the real parts of the odd index components of the discrete Fourier transform of order N/2 of said sequence. Taking account of the symmetries, the (N/2) number supplied by this operation, equal to cos TFD($2q+1$, N/2, $x^1$) for q between 0 and (N/2)−1, amounts to N/8 different numbers designated ($\alpha_{2q+1}$), $0 \leq q \leq (N/8)-1$.

(d) an operation 14 receiving the sequence $x^1$ and supplying the imaginary parts of the odd index components of the order N/2 discrete Fourier transform of said sequence. Taking account of the symmetries, the N numbers supplied by this operation, equal to sin TFD($2q+1$, N/2, $x^1$) for q between 0 and (N/2)−1, amount to (N/8) different numbers designated ($\beta_{2q+1}$), $0 \leq q \leq (N/8)-1$.

(e) an operation 16 receiving the sequence $x^2$ and supplying the components of the order (N/4) sine transform of said sequence. Taking account of the symmetries, the N/2 numbers supplied by this operation, equal to TSD($2q+1$, N/4, $x^2$) for q between 0 and (N/2)−1, amounts to N/8 different numbers designated ($\delta_{2q+1}$), $0 \leq q \leq (N/8)-1$.

(f) an operation 18 receiving the odd sequences $\alpha$, $\beta$, $\gamma$ and $\delta$, and supplying the uneven sequences $\lambda$, $\mu$, $\nu$, and $\rho$ according to the following equations:

$$\lambda_{2q+1} = \alpha_{2q+1} - \gamma_{2q+1}$$
$$\mu_{2q+1} = \alpha_{2q+1} + \gamma_{2q+1}$$
$$\nu_{2q+1} = \beta_{2q+1} + \delta_{2q+1}$$
$$\rho_{2q+1} = \beta_{2q+1} - \delta_{2q+1}$$

with $0 \leq q \leq (N/8)-1$ (g) an operation 20 receiving the odd sequences $\lambda$, $\mu$, $\nu$, and $\rho$ and supplying the uneven index components of the cosine transform, said operation being defined by the following relations:

$$X_{N/2+(2q+1)} = c\left(\frac{N+2q+1}{8}\right) \cdot \lambda_{2q+1} + s\left(\frac{N+2q+1}{8}\right) \cdot \rho_{2q+1}$$

$$X_{2q+1} = c\left(\frac{2q+1}{8}\right) \cdot \mu_{2q+1} + s\left(\frac{2q+1}{8}\right) \cdot \nu_{2q+1}$$

$$X_{N-(2q+1)} = -c\left(\frac{2q+1}{8}\right) \cdot \mu_{2q+1} - s\left(\frac{2q+1}{8}\right) \cdot \nu_{2q+1}$$

$$X_{N/2-(1q+1)} = c\left(\frac{N-(2q+1)}{8}\right) \cdot \lambda_{2q+1} - s\left(\frac{N-(2q+1)}{8}\right) \cdot \delta_{2q+1}$$

with $0 \leq q \leq (N/8)-1$ and in which $c(k/8) = \cos(2\pi k/8N)$ and $s(k/8) = \sin(2\pi k/8N)$.

The symmetries making it possible to reduce the N/8 the number of output points of operations 10, 12, 14 and 16 result directly from the expressions TCD, TSD, cos TFD and sin TFD. For example TCD($2q+1+N/2$, N/4, $x^3$) is written $$\sum_{j=0}^{N/8-1} x_j^3 \cdot \cos\left[\frac{2\pi(2j+1)(2q+1)}{N} + \pi(2q+1)\right]$$

i.e. −TCD($2q+1$, N/4, $x^3$).

In general terms, we thus obtain the following relations for $0 \leq q \leq (N/8)-1$:

$$\gamma_{2q+1} = TCD(2q + 1, N/4, x^3)$$
$$= -TCD\left(\frac{N}{2} - (2q + 1), N/4, x^3\right)$$
$$= -TCD\left(\frac{N}{2} + (2q + 1), N/4, x^3\right)$$
$$= TCD(N - (2q + 1), N/4, x^3)$$

in the same way $$\alpha_{2q+1} = \cos TFD(2q + 1, N/2, x^1)$$
$$= \cos TFD\left(\frac{N}{2} - (2q + 1), N/2, x^1\right)$$
$$= \cos TFD\left(\frac{N}{2} + (2q + 1), N/2, x^1\right)$$
$$= \cos TFD(n - (2q + 1), N/2, x^1)$$

$$\beta_{2q+1} = \sin TFD(2q + 1, N/2, x^1)$$
$$= -\sin TFD\left(\frac{N}{2} - (2q + 1), N/2, x^1\right)$$
$$= \sin TFD\left(\frac{N}{2} + (2q + 1), N/2, x^1\right)$$
$$= -\sin TFD(N - (2q + 1), N/2, x^1)$$

$$\delta_{2q+1} = TSD(2q + 1, N/4, x^2)$$
$$= TSD\left(\frac{N}{2} - (2q + 1), N/4, x^2\right)$$
$$= -TSD\left(\frac{N}{2} + (2q + 1), N/4, x^2\right)$$
$$= -TSD(N - (2q + 1), N/4, x^2)$$

It is of interest to point out that the odd sequences $\lambda$ and $\mu$ represent the real parts of the odd index components of the Fourier transform of a sequence $x^5$ defined by: $x_j^5 = y_{21}$ if $0 \leq j \leq (N/4)-1$ and $x_j^5 = -y_{N-2j-1}$ if $N/4 \leq j \leq (N/2)-1$. These components are $\cos TFD(2q+1, N, x^5)$, for $q$ between 0 and $(N/2)-1$.

In the same way, the odd sequences $\nu$ and $\rho$ represent the imaginary paths of the odd index components of the Fourier transform of the sequence $x^5$ and are designate $\sin TFD(2q+1, N, x^5)$ for $q$ between 0 and $(N/2)-1$.

Thus, operations 12 and 14 can be performed by recurrence on N. Moreover, operation 16 is structurally identical to operation 10 and can also be carried out by recurrence.

Finally, it is possible to verify that operations 12, 14 and 16 have a number of stages equal to or lower than the number of stages of operation 10 and that for each of the operations said stages are of the same type (adder or multiplier).

Thus, recurrence can be based on the number of stage necessary for performing operation 10. This operation, which calculates the odd components of the n/4 cosine transform is carried out by a sequence of stages equal to the stages for calculating the complete cosine transform, less the initial adder stage. As operation 8 is an addition, it can be said that operations 8 and 10 require a number of stages identical to the group of stages of a N/4 cosine transform circuit.

Thus, having a group of stages forming a N/4 cosine transform circuit (corresponding to operations 8 and 10), it is merely necessary to add to adder stages and a multiplier stage (corresponding respectively to operations 2, 18 and 20) to obtain a size N cosine transform calculating circuit.

FIGS. 3a and 3b illustrate the direct cosine transform graph, whilst the inverse transform graph can easily be deduced therefrom. It is merely necessary to perform the the operation in the reverse order, replacing said operations by the transposed operations, the latter being defined as operations, whose associated matrixes are transposes of the matrixes associated with the direct transform operations.

A successive description will now be given of a trellis corresponding to case N=16 and a trellis corresponding to case N=32.

Figure 4A:
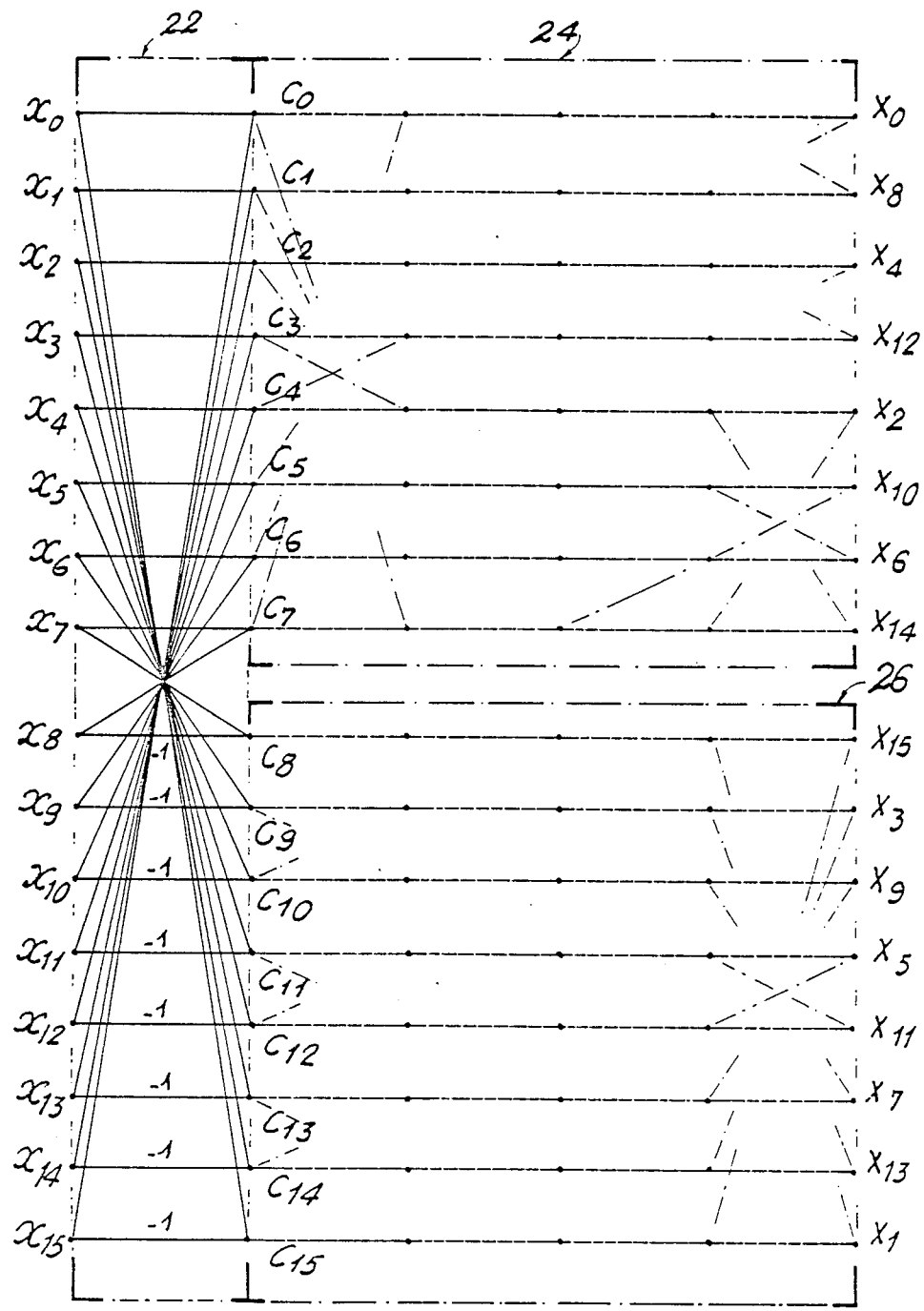
FIG. 4a, diagrammatically a trellis associated with the circuit according to the invention in the case of n=16.
Figure 4B:
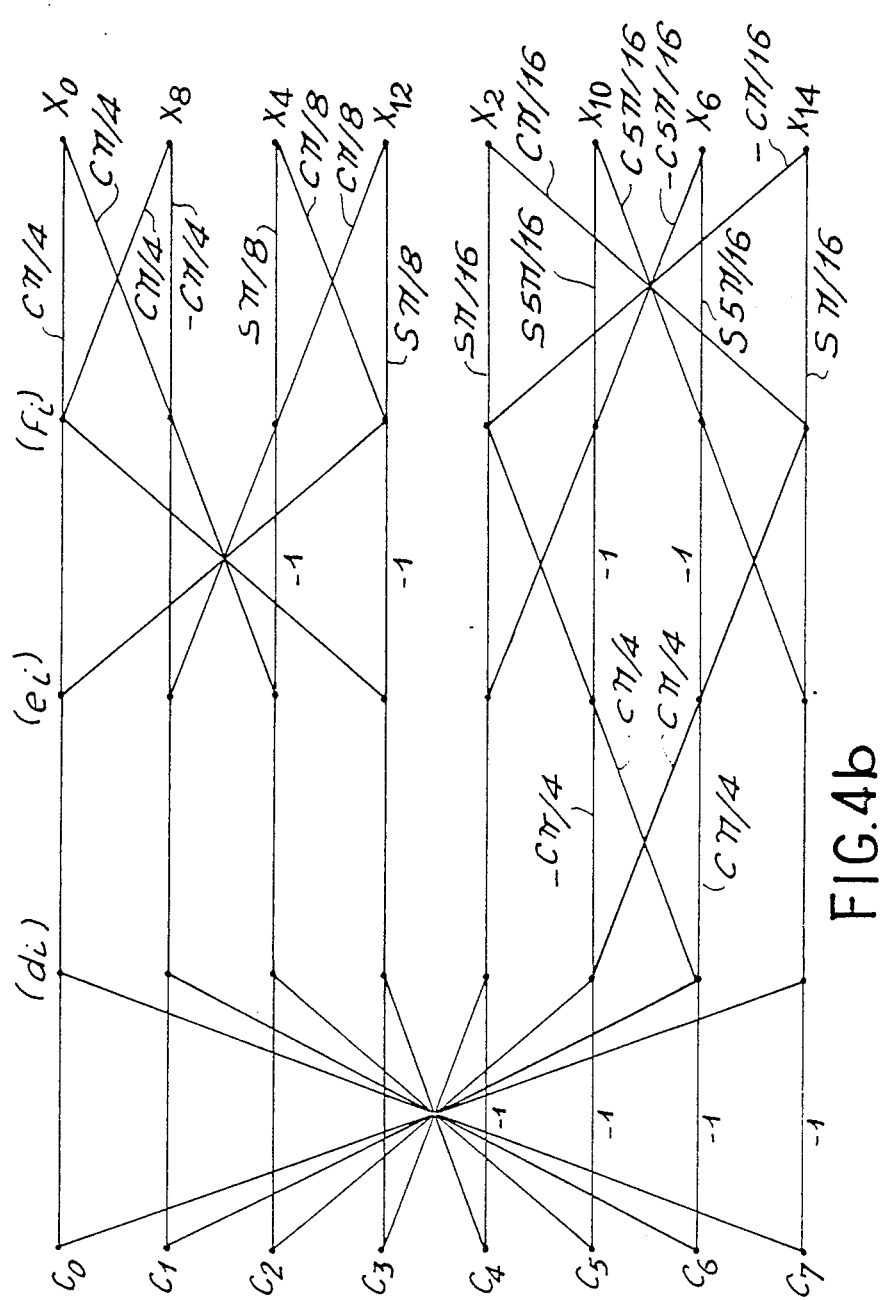
Figure 4C:
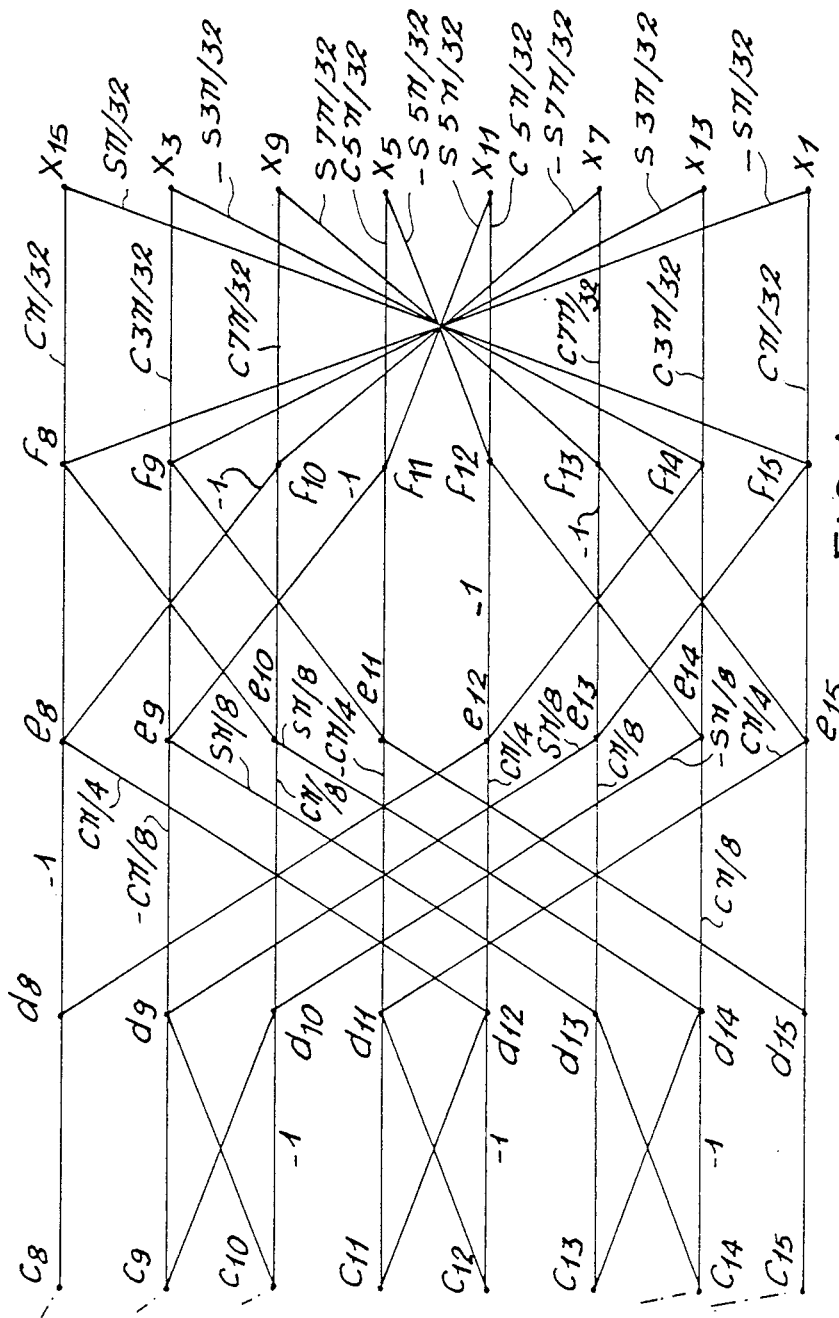

FIGS. 4a, 4b and 4c represent a trellis of the cosine transform for case N=16. This trellis can be broken down into three operations 22, 24 and 26 (FIG. 4a). Operation 22 is the initial addition operation common to all the trellises. This stage consists of transforming the sequence $(x_j)$, $0 \leq j \leq 15$, into a sequence $(c_j)$, $0 \leq j \leq 15$, $c_j = x_j + x_{15-j}$, $c_{8+j} = +x_j - x_{15-j}$, in which $0 \leq j \leq 7$.

Operation 24 applies to the sequence $(c_j)$, $0 \leq j \leq 7$ being represented in FIG. 4b by the trellis of the cosine transform of size N=8, according to the invention. This operation 24 supplies the even index components of the cosine transform in the following order: $X_0$, $X_8$, $X_4$, $X_{12}$, $X_2$, $X_{10}$, $X_6$, and $X_{14}$.

This trellis successively has four stages: an addition, a multiplication, an addition and a multiplication. The first addition supplies eight values $d_0, d_1, \ldots d_7$ according to the following relations:

$$d_j = c_j + c_{7-j} \text{ for } 0 \leq j \leq 3$$
$$d_j = c_j - c_{7-j} \text{ for } 4 \leq j \leq 7$$

The four first values $d_0, d_1, d_2, d_3$ give the even index components $X_0, X_8, X_4,$ and $X_{12}$ of the cosine transform.

The first multiplication is defined by:

$$e_0 = d_0$$
$$e_1 = d_1$$
$$e_2 = d_2$$
$$e_3 = d_3$$
$$e_4 = d_4$$
$$e_5 = -c\frac{\pi}{4} \cdot d_5 + c\frac{\pi}{4} \cdot d_6$$
$$e_6 = c\frac{\pi}{4} \cdot d_5 + c\frac{\pi}{4} \cdot d_6$$
$$e_7 = d_7$$

It should be noted that the first multiplication applied to the components $d_0, d_1, d_2$ and $d_3$ is an identity operation. This operation makes it possible to perform the second addition on these components at the same time as the second addition on the four components $e_4, e_5, e_6$ and $e_7$. Thus, each calculating stage simultaneously receives all the components of a sequence, which permits a pipeline-type processing.

The second addition is defined by:

$$f_0 = e_0 + e_3$$
$$f_1 = e_1 + e_2$$
$$f_2 = e_1 - e_2$$

-continued
$$f_3 = e_0 - e_3$$
$$f_4 = e_4 + e_5$$
$$f_5 = e_4 - e_5$$
$$f_6 = -e_6 + e_7$$
$$f_7 = e_6 + e_7$$

Finally, the third multiplication is defined by:

$$X_0 = c\frac{\pi}{4} \cdot f_0 + c\frac{\pi}{4} \cdot f_1$$

$$X_8 = c\frac{\pi}{4} \cdot f_0 - c\frac{\pi}{4} \cdot f_1$$

$$X_4 = s\frac{\pi}{8} \cdot f_2 + c\frac{\pi}{8} \cdot f_3$$

$$X_{12} = -c\frac{\pi}{8} \cdot f_2 + s\frac{\pi}{8} \cdot f_3$$

$$X_2 = s\frac{\pi}{16} \cdot f_4 + c\frac{\pi}{16} \cdot f_7$$

$$X_{10} = s\frac{5\pi}{16} \cdot f_5 + c\frac{5\pi}{16} \cdot f_6$$

$$X_6 = -c\frac{5\pi}{16} \cdot f_5 + s\frac{5\pi}{16} \cdot f_6$$

$$X_{14} = -c\frac{\pi}{16} \cdot f_4 + s\frac{\pi}{16} \cdot f_7$$

Operation 26 transforms the sequence $(C_j)$, $8 \leq j \leq 15$, into odd index components of the cosine transform. According to the invention, operation 26 is constituted by the four following successive operations: an addition, a multiplication, an addition and a multiplication.

The detailed trellis corresponding to operation 26 is shown in FIG. 4c.

These operations are defined by the following equations:
first addition (table I),
first multiplication (table II),
second addition (table III),
second multiplication (table IV).

In this trellis, elements $e_i$, in which $8 \leq i \leq 15$, represent the different values of cos TFD, sin TFD, TCD and TSD appearing in FIG. 3b. The components $f_i$, in which $8 \leq i \leq 15$, supplied by the second adder stage represent cos TFD+TCD and sin TFD+TSD, i.e. the quantity supplied by operation 18 in FIG. 3b.

The trellis according to the invention shown in FIGS. 4a, 4b and 4c leads to a gain of one multiplier stage compared with the prior art art trellis. An identical gain is obtained in case N=32. The corresponding trellis only has seven stages, including three multiplier stage.

Figure 5A:
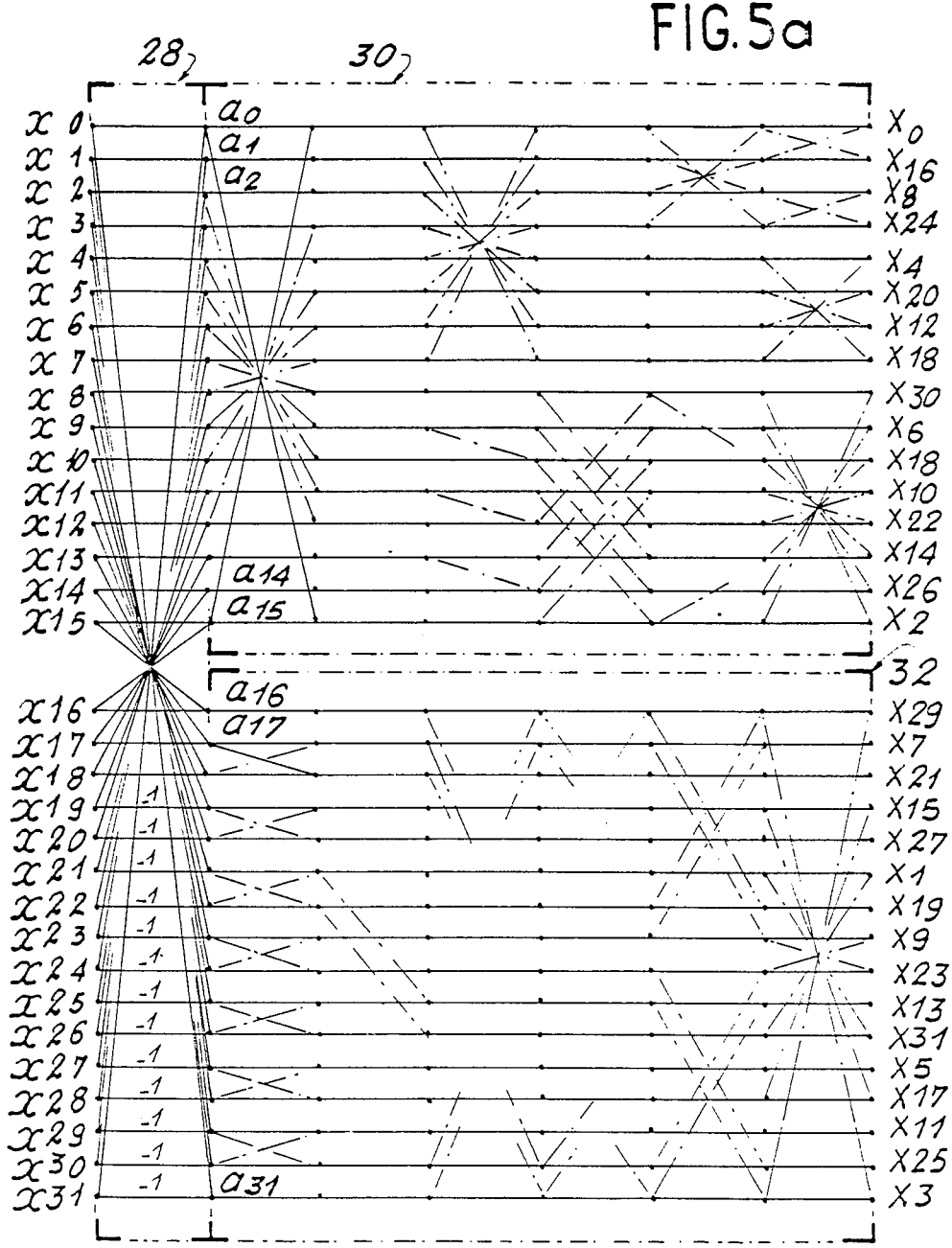
FIG. 5a, diagrammatically a trellis associated with the circuit according to the invention in the case of N=32.

FIG. 5a shows the trellis corresponding to the fast calculating process of the cosine transform according to the invention in the case of N=32. This trellis is shown in the form of a block of three operations respectively designated 28, 30 and 32. Operation 28 is the initial addition common to all the trellises and it transforms the sequence $(x_i)$, $0 \leq i \leq 31$, into a sequence $(a_j)$, $0 \leq j \leq 31$ defined by $a_j = x_j + x_{31-j}$ and $a_{16+j} = x_j - x_{31-j}$, for $0 \leq j \leq 15$.

Operation 30 represents the trellis according to the invention for N=16. It transforms the 16 first components $a_0, a_1, \ldots a_{15}$ into even index components of the cosine transform of sequence $(x_i)$, $0 \leq i \leq 31$, in the following order: $X_0, X_{16}, X_8, X_{24}, X_4, X_{20}, X_{12}, X_{28}, X_{30}, X_6, X_{18}, X_{10}, X_{22}, X_{14}, X_{26}$ and $X_2$.

Operation 30 is represented by the trellis of FIG. 5b and is functionally identical to the trellis shown in FIGS. 4a, 4b and 4c and corresponding to N=16. Its formation differs slightly through the addition between the two first adder stages of a multiplier stage equal to the identity operation. This supplementary stage makes it possible to synchronize the additions and multiplications performed by operations 30 and 32, which permits a pipeline-type processing.

Figure 5C:
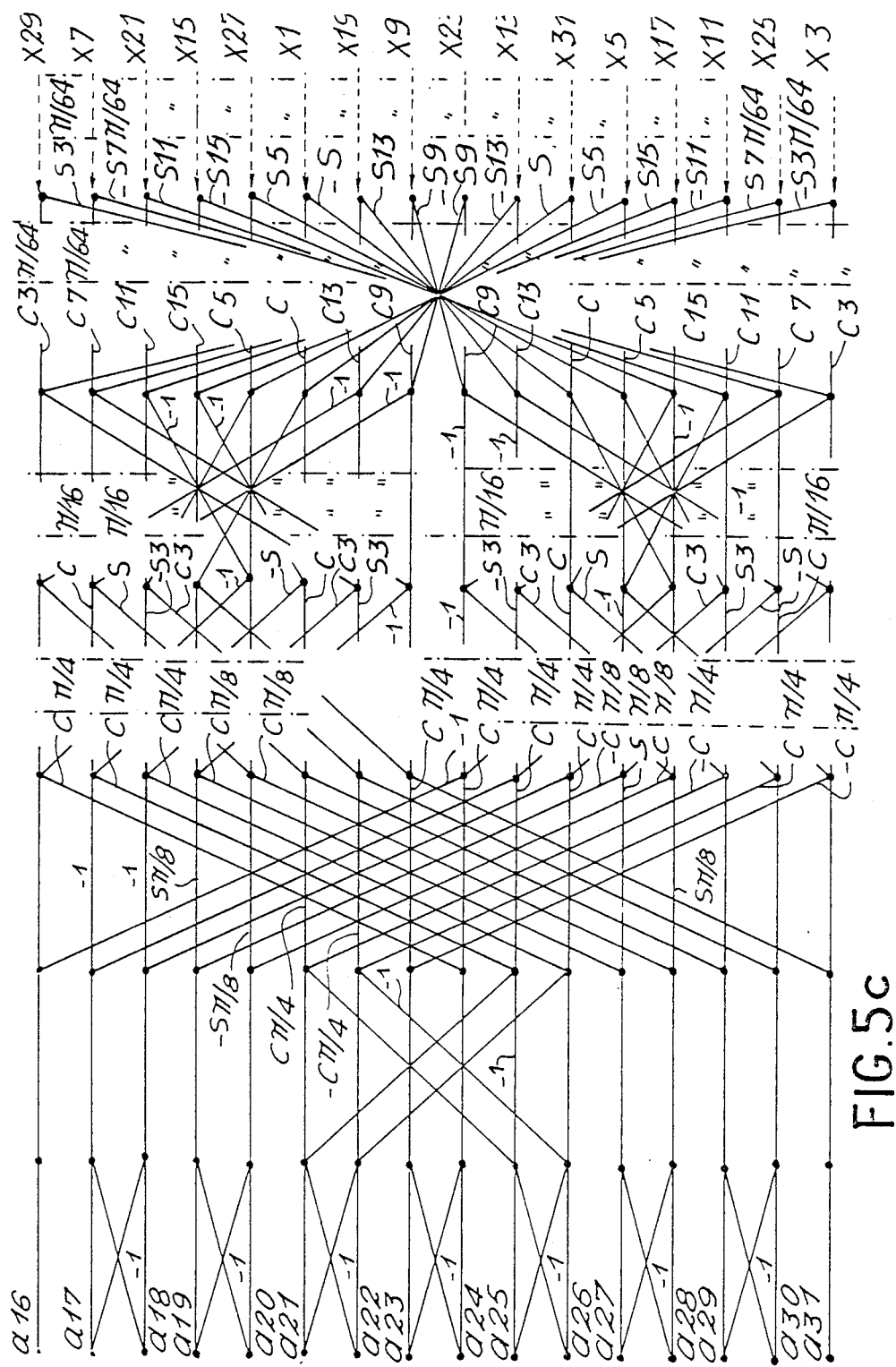

A description will now be given with reference to FIG. 5c of the trellis corresponding to operation 32, which transforms the 16 final components $a_{16}, a_{17}, \ldots a_{31}$ into uneven index components of the cosine transform of sequence $(x_1, 0 \leq i \leq 31)$. It is constituted by a sequence of stages successively comprising a first addition, a second addition, a first multiplication, a second multiplication, a third addition and a third multiplication. These operations are defined by the following relations:
first addition (table V),
second addition (table VI),
first multiplication (table VII),
second multiplication (table VIII),
third addition (table IX),
third multiplication (table X).

The calculations corresponding to the trellis shown in FIGS. 3a to 5c are performed by circuits having in series adder stage and multiplier stages. For example, a description will be given of the basic diagram of a circuit corresponding to N=16 and which is shown in FIG. 6.

This circuit comprises in series five calculating stages 114, 116, 118, 120 and 122. Each of these circuits comprises 16 inputs and 16 outputs. Stages 114, 116 and 120 are adder stages of form $a \pm b$ and stages 118 and 122 are multiplier stages of form $\alpha a \pm \beta b$. The calculation performed by the stage of rank k, in which k is between 1 and 5, corresponds to the stage of rank k of the trellis shown in FIGS. 4a, 4b and 4c.

Figures 7, 8:
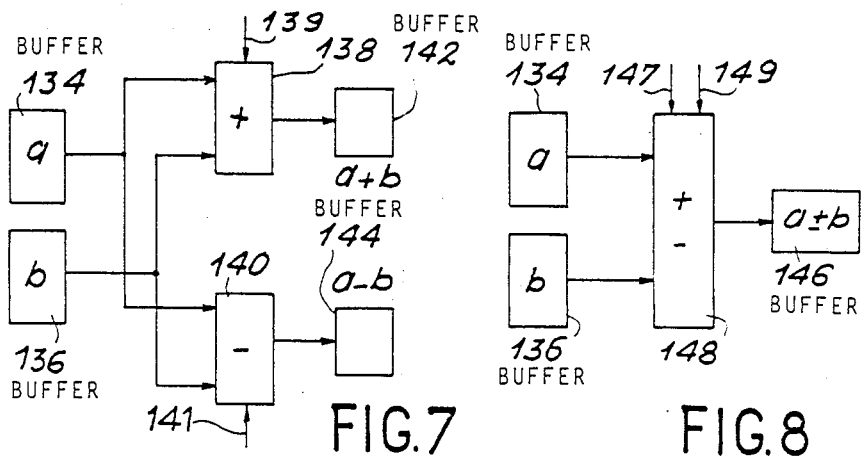
FIG. 7, a first embodiment of an adder stage of the circuit of FIG. 6..
FIG. 8, a second embodiment of an adder stage of the circuit of FIG. 6.

With reference to FIGS. 7 and 8, a description will be given of special embodiments of an adder stage and with reference to FIGS. 9 and 10 to special embodiments of a multiplier stage. The circuit shown in FIG. 6 also comprises double memories 124, 126, 128 and 130, each arranged in series between two successive stages. In the represented case, each double memory has two series of 16 storage cells. More generally, the size of each series is equal to N. Each series of N cells of a double memory can receive the N value supplied by the preceding stage.

The two series of the same memory operate in ping pong manner. At a given instant, a series receives the N value supplied by the preceding stage, whilst the other series supplies the N stored values to the following stage. At the next instant, the function of each series is reversed, the receiving series becoming transmitting and the transmitting series becoming receiving.

These double memories are used for synchronizing the data flows between the different calculating stages, thereby permitting a pipeline-type processing. In the case of sequential processing without pipeline, these double memories can be eliminated.

In general, each adder stage comprises a single adder and a single subtracter and in the same way each multiplier stage comprises two multipliers, an adder and a subtracter. The processing of the N values received by the stage in this case takes place sequentially. It is then necessary to add a single memory between each calculating stage if the circuit has no double memory. Moreover, a buffer store 132 can be arranged at the input of adder stage 114.

A description will now be given of embodiments of a adder stage and a multiplier stage with reference to FIGS. 7 to 10.

FIG. 7 shows a first embodiment of an adder stage essentially comprising two input buffers 134, 136 for storing numbers a and b, an adder 138, a subtracter 140 and two output buffers 142, 144. Adder 138 has a control input 139 controlling either the addition of the two numbers contained in the input buffers, or the transmission of one of these numbers. In the same way, subtracter 140 comprises an input 141 having a similar function. Thus, output buffer 142 can receive a+b, a or b and the output buffer 114 a−b, a or −b.

FIG. 8 illustrates a variant of the adder stage. The subtracter and the adder are replaced by an adder-subtracter 148 having two control inputs 147, 149 for defining the number supplied to the output buffer 146, which can be equal to a, −b, a+b or a−b.

The adder stages shown in FIGS. 7 and 8 also comprise a sequencer and an addressing means, which are not shown, the latter being used for loading the input buffers with numbers contained in the memory preceding said stage and for storing the content of an output buffer in the following memory.

Figure 9:
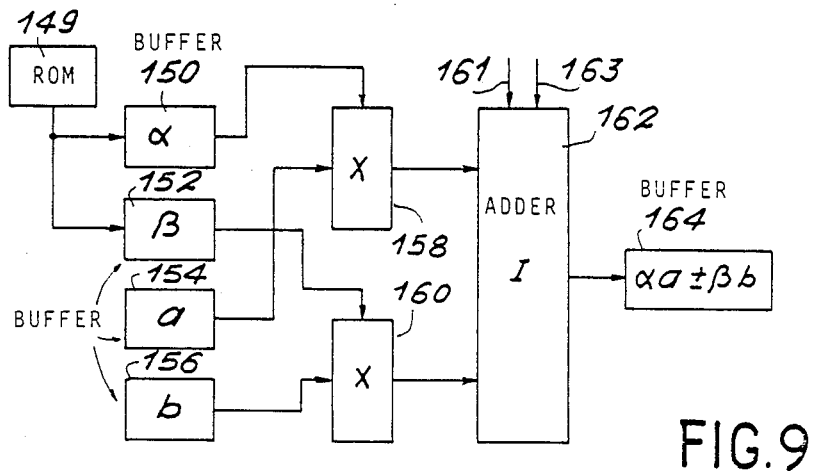
FIG. 9, a first embodiment of a multiplier stage of the circuit of FIG. 6.

FIG. 9 shows a first embodiment of a multiplier stage, comprising four input buffers 150, 152, 154 and 156, respectively containing the numbers $\alpha$, $\beta$, a and b, two multipliers 158 and 160 for supplying the product a and b, an adder-substracter 162 having two control inputs 161, 163 and an output buffer 164 receiving, as a function of the signals applied to the control inputs 161, 163, $\alpha a$, $\beta b$, $\alpha a + \beta b$ or $\alpha a - \beta b$.

The input buffers 154, 156 receive numbers from the memory preceding the multiplier stage. The input buffers 150 and 152 are loaded with numbers contained in a read only memory 149 associated with said stage, which also comprises a not shown sequencer and addressing means.

The input buffers 150, 152 can respectively receive the coefficients $\alpha$ and $\beta$, but also the coefficients $\beta$ and $\alpha$. In this case, buffer 164 can receive numbers $\alpha b$, $\beta a$, $\beta a - \alpha b$. $\beta a + \alpha b$. If it is not possible to randomly apply each coefficient $\alpha$ and $\beta$ towards the input buffers 150 and 152, it is necessary to provide two circuits like that of FIG. 9, in one of which the input buffers 150 and 152 respectively receive $\alpha$ and $\beta$ and in the other they respectively receive $\beta$ and $\alpha$.

A first variant of the circuit of FIG. 9 consists of replacing the adder-subtracter 162 by a separate adder and subtracter. In this case, four multipliers are necessary, two being associated with the adder and two with the subtracter.

Figure 10:
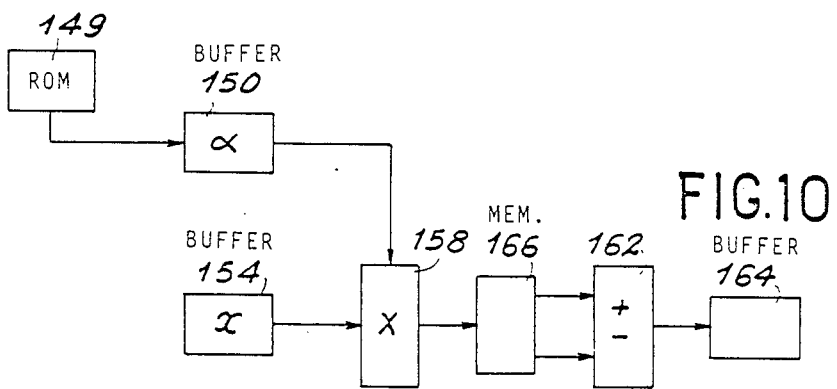
FIG. 10, a second embodiment of a multiplier stage of the circuit of FIG. 6.

A second variant is shown in FIG. 10. This circuit is of interest in the case where a lower processing speed is acceptable. The elements identical to those in FIG. 9 carry the same references in FIG. 10. In this stage, the input buffers 152, 156 and the multiplier 160 have been eliminated. An accumulator-type memory 166 with one input and two outputs is located between multiplier 158 and adder-subtracter 162. Memory 166 and adder-subtracter 162 can be replaced by an adder-subtracter having an accumulator-type input. The advantage of this embodiment is that it only requires a single multiplier, which is very advantageous from the economic standpoint.

With reference to FIGS. 3a to 5c trellises have been provided corresponding to the calculation of the cosine transform according to the invention. The cosine processing performed on a signal often serves to carry out a processing of said signal in the frequency field. This is generally followed by the inverse cosine transform of said processed signal. The trellis corresponding to the inverse cosine transform is easily obtained from the direct transform trellis. It is merely necessary to replace the calculating operations by their transposes and to reverse the order of these operations, as stated relative to FIGS. 3a and 3b.

Figure 11:
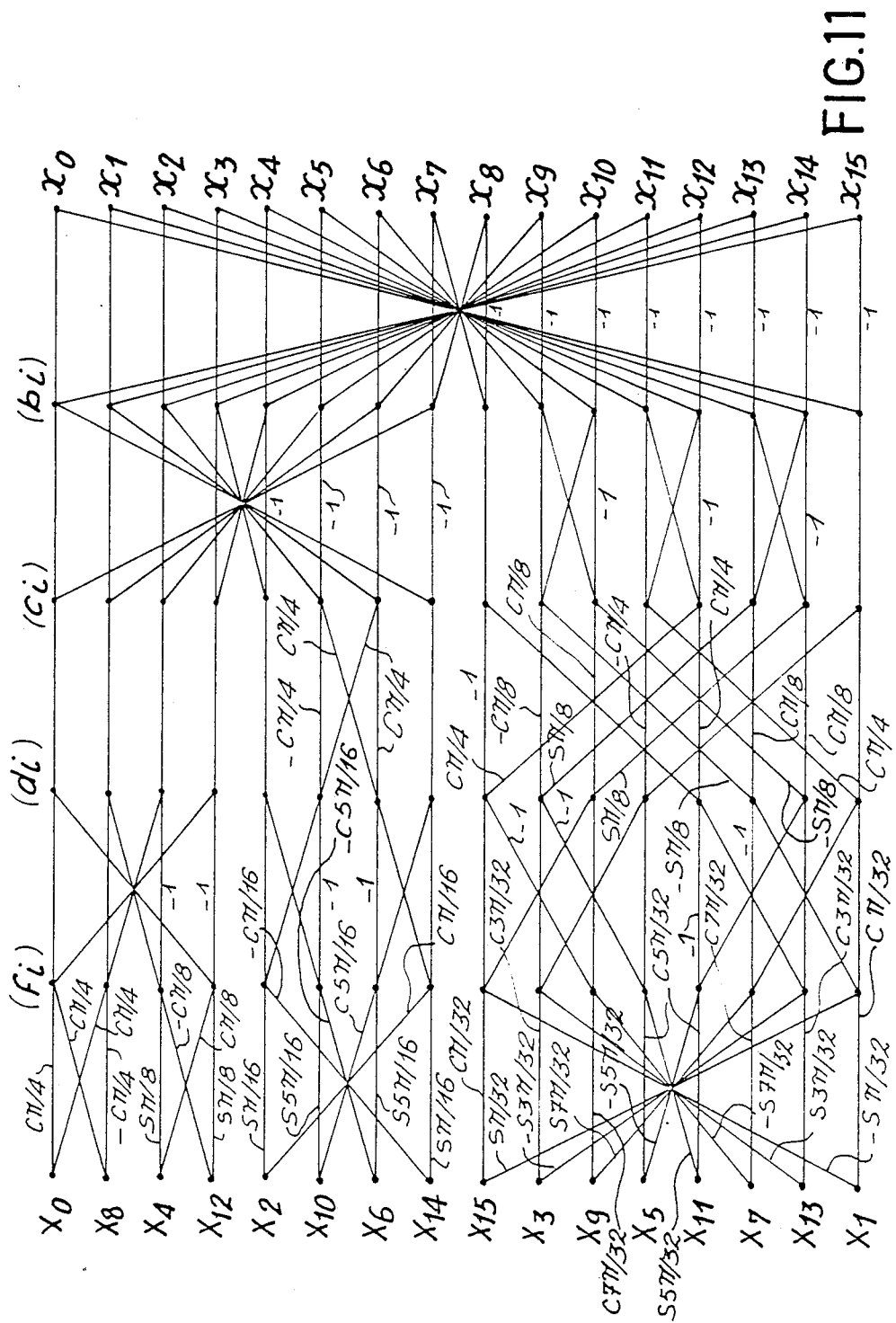
FIG. 11, a trellis associated with the inverse or reverse cosine transform circuit according to the invention in the case of N=16.

For example, FIG. 11 shows the trellis corresponding to the inverse cosine transform for N=16. This trellis exactly corresponds to the trellis of FIG. 4a, read from right to left with the same coefficients.

FIG. 12 shows the basic diagram of the circuit associated with this inverse transformation. The calculating stages identical to those of the circuit of FIG. 6, but their order is reversed. Between said calculating stages are inserted double memories 166, 168, 170 and 172, whose function is identical to that of memories 124, 126, 128 and 130 of the circuit of FIG. 7. Moreover, memory 174 located at the input of the circuit of FIG. 12 has an identical function to that of memory 132 of the circuit of FIG. 6.

TABLE I $d_8 = c_8$
$d_9 = c_9 + c_{10}$
$d_{10} = c_9 - c_{10}$
$d_{11} = c_{11} + c_{12}$
$d_{12} = c_{11} - c_{12}$
$d_{13} = c_{13} + c_{14}$
$d_{14} = c_{13} - c_{14}$
$d_{15} = c_{15}$

TABLE II $e_8 = -d_8 + c\frac{\pi}{4} \cdot d_{12}$ $e_9 = -c\frac{\pi}{8} \cdot d_9 + s\frac{\pi}{8} \cdot d_{13}$ $e_{10} = c\frac{\pi}{8} \cdot d_{10} + s\frac{\pi}{8} \cdot d_{14}$ $e_{11} = -c\frac{\pi}{4} \cdot d_{11} + d_{15}$ $e_{12} = d_8 + c\frac{\pi}{4} \cdot d_{12}$ $e_{13} = s\frac{\pi}{8} \cdot d_9 + c\frac{\pi}{8} \cdot d_{13}$ $e_{14} = -s\frac{\pi}{8} \cdot d_{10} + c\frac{\pi}{8} \cdot d_{14}$ $e_{15} = c\frac{\pi}{4} \cdot d_{11} + d_{15}$

TABLE III $f_8 = e_8 + e_{10}$
$f_9 = e_9 = e_{11}$
$f_{10} = -e_8 + e_{10}$
$f_{11} = -e_9 + e_{11}$
$f_{12} = -e_{12} + e_{14}$
$f_{13} = -e_{13} + e_{15}$
$f_{14} = e_{12} + e_{14}$
$f_{15} = e_{13} + e_{15}$

TABLE IV $$X_{15} = c\frac{\pi}{32} \cdot f_8 + s\frac{\pi}{32} \cdot f_{15}$$

$$X_3 = c\frac{3\pi}{32} \cdot f_9 - s\frac{3\pi}{32} \cdot f_{14}$$

$$X_9 = c\frac{7\pi}{32} \cdot f_{10} + s\frac{7\pi}{32} \cdot f_{13}$$

$$X_5 = c\frac{5\pi}{32} \cdot f_{11} - s\frac{5\pi}{32} \cdot f_{12}$$

$$X_{11} = s\frac{5\pi}{32} \cdot f_{11} + c\frac{5\pi}{32} \cdot f_{12}$$

$$X_7 = -s\frac{7\pi}{32} \cdot f_{10} + c\frac{7\pi}{32} \cdot f_{13}$$

$$X_{13} = s\frac{3\pi}{32} \cdot f_9 + c\frac{3\pi}{32} \cdot f_{14}$$

$$X_1 = -s\frac{\pi}{32} \cdot f_8 + c\frac{\pi}{32} \cdot f_{15}$$

TABLE V $b_{16} = a_{16}$
$b_{17} = a_{17} + a_{18}$
$b_{18} = a_{17} - a_{18}$
$b_{19} = a_{19} + a_{20}$
$b_{20} = a_{19} - a_{20}$
$b_{21} = a_{21} + a_{22}$
$b_{22} = a_{21} - a_{22}$
$b_{23} = a_{23} + a_{24}$
$b_{24} = a_{23} - a_{24}$
$b_{25} = a_{25} + a_{26}$
$b_{26} = a_{25} - a_{26}$
$b_{27} = a_{27} + a_{28}$
$b_{28} = a_{27} - a_{28}$
$b_{29} = a_{29} + a_{30}$
$b_{30} = a_{29} - a_{30}$
$b_{31} = a_{31}$

TABLE VI $c_{16} = b_{16}$
$c_{17} = b_{17}$
$c_{18} = b_{18}$
$c_{19} = b_{19}$
$c_{20} = b_{20}$
$c_{21} = b_{21} + b_{25}$
$c_{22} = b_{22} - b_{26}$
$c_{23} = b_{23}$
$c_{24} = b_{24}$
$c_{25} = -b_{25} + b_{21}$
$c_{26} = b_{22} + b_{26}$
$c_{27} = b_{27}$
$c_{28} = b_{28}$
$c_{29} = b_{29}$
$c_{30} = b_{30}$
$c_{31} = b_{31}$

TABLE VII $$d_{16} = c_{16} + c\frac{\pi}{4} \cdot c_{24}$$

$$d_{17} = -c_{17} + c\frac{\pi}{4} \cdot c_{25}$$

$$d_{18} = -c_{18} + c\frac{\pi}{4} \cdot c_{26}$$

$$d_{19} = s\frac{\pi}{8} \cdot c_{19} + c\frac{\pi}{8} \cdot c_2$$

$$d_{20} = -s\frac{\pi}{8} \cdot c_{20} + c\frac{\pi}{8} \cdot c_2$$

TABLE VII-continued $$d_{21} = c\frac{\pi}{4} \cdot c_{21} + c_{29}$$

$$d_{22} = -c\frac{\pi}{4} \cdot c_{22} + c_{30}$$

$$d_{23} = c\frac{\pi}{4} \cdot c_{23} + c_{31}$$

$$d_{24} = -c_{16} + c\frac{\pi}{4} \cdot c_{24}$$

$$d_{25} = c_{17} + c\frac{\pi}{4} \cdot c_{25}$$

$$d_{26} = c_{18} + c\frac{\pi}{4} \cdot c_{26}$$

$$d_{27} = -c\frac{\pi}{8} \cdot c_{19} + s\frac{\pi}{8} \cdot c_2$$

$$d_{28} = c\frac{\pi}{8} \cdot c_{20} + s\frac{\pi}{8} \cdot c_{28}$$

$$d_{29} = -c\frac{\pi}{4} \cdot c_{21} + c_{29}$$

$$d_{30} = c\frac{\pi}{4} \cdot c_{22} + c_{30}$$

$$d_{31} = -c\frac{\pi}{4} \cdot c_{23} + c_{31}$$

TABLE VIII $$e_{16} = d_{16} + d_{20}$$

$$e_{17} = c\frac{\pi}{16} \cdot d_{17} + s\frac{\pi}{16} \cdot d_{21}$$

$$e_{18} = -s\frac{3\pi}{16} \cdot d_{18} + c\frac{3\pi}{16} \cdot d_{22}$$

$$e_{19} = d_{19} + d_{23}$$

$$e_{20} = -d_{16} + d_{20}$$

$$e_{21} = -s\frac{\pi}{16} \cdot d_{17} + c\frac{\pi}{16} \cdot d_{21}$$

$$e_{22} = c\frac{3\pi}{16} \cdot d_{18} + s\frac{3\pi}{16} \cdot d_{22}$$

$$e_{23} = -d_{19} + d_{23}$$

$$e_{24} = -d_{24} + d_{28}$$

$$e_{25} = -s\frac{3\pi}{16} \cdot d_{25} + c\frac{3\pi}{16} \cdot d_{29}$$

$$e_{26} = c\frac{\pi}{16} \cdot d_{26} + s\frac{\pi}{16} \cdot d_{30}$$

$$e_{27} = -d_{27} + d_{31}$$

$$e_{28} = d_{24} + d_{28}$$

$$e_{29} = c\frac{3\pi}{16} \cdot d_{25} + s\frac{3\pi}{16} \cdot d_{29}$$

$$e_{30} = -s\frac{\pi}{16} \cdot d_{26} + c\frac{\pi}{16} \cdot d_{30}$$

$$e_{31} = d_{27} + d_{31}$$

TABLE IX $f_{16} = e_{16} + e_{22}$
$f_{17} = e_{17} + e_{23}$
$f_{18} = e_{18} - e_{20}$
$f_{19} = e_{19} - e_{21}$

TABLE IX-continued $f_{20} = e_{18} + e_{20}$
$f_{21} = e_{19} + e_{21}$
$f_{22} = -e_{16} + e_{22}$
$f_{23} = -e_{17} + e_{23}$
$f_{24} = -e_{24} + e_{30}$
$f_{25} = -e_{25} + e_{31}$
$f_{26} = e_{26} + e_{28}$
$f_{27} = e_{27} + e_{29}$
$f_{28} = e_{26} - e_{28}$
$f_{29} = e_{27} - e_{29}$
$f_{30} = e_{24} + e_{30}$
$f_{31} = e_{25} + e_{31}$

TABLE X $X_{29} = c\frac{3\pi}{64} \cdot f_{16} + s\frac{3\pi}{64} \cdot f_{31}$ $X_7 = c\frac{7\pi}{64} \cdot f_{17} - s\frac{7\pi}{64} \cdot f_{30}$ $X_{21} = c\frac{11\pi}{64} \cdot f_{18} + s\frac{11\pi}{64} \cdot f_{29}$ $x_{15} = c\frac{15\pi}{64} \cdot f_{19} - s\frac{15\pi}{64} \cdot f_{28}$ $X_{27} = c\frac{5\pi}{64} \cdot f_{20} + s\frac{5\pi}{64} \cdot f_{27}$ $X_1 = c\frac{\pi}{64} \cdot f_{21} - s\frac{\pi}{64} \cdot f_{26}$ $x_{19} = c\frac{13\pi}{64} \cdot f_{22} + s\frac{13\pi}{64} \cdot f_{25}$ $X_9 = c\frac{9\pi}{64} \cdot f_{23} - s\frac{9\pi}{64} \cdot f_{24}$ $x_{23} = c\frac{9\pi}{64} \cdot f_{24} + s\frac{9\pi}{64} \cdot f_{23}$ $X_{13} = c\frac{13\pi}{64} \cdot f_{25} - s\frac{13\pi}{64} \cdot f_{22}$ $X_{31} = c\frac{\pi}{64} \cdot f_{26} + s\frac{\pi}{64} \cdot f_{21}$ $X_5 = c\frac{5\pi}{64} \cdot f_{27} - s\frac{5\pi}{64} \cdot f_{20}$ $X_{17} = c\frac{15\pi}{64} \cdot f_{28} + s\frac{15\pi}{64} \cdot f_{19}$ $X_{11} = c\frac{11\pi}{64} \cdot f_{29} - s\frac{11\pi}{64} \cdot f_{18}$ $X_{25} = c\frac{7\pi}{64} \cdot f_{30} + s\frac{7\pi}{64} \cdot f_{17}$ $X_3 = c\frac{3\pi}{64} \cdot f_{31} - s\frac{3\pi}{64} \cdot f_{16}$

What is claimed is:

1. A circuit for the fast calculation of the cosine transform $(X_i)$, $0 \leq i \leq N-1$, in which $N=2^n$, $n \geq 4$ of a discretized signal defined by a sequence $(x_i)$, $0 \leq i \leq N-1$, wherein said circuit receives a sequence $(x_j)$, $0 \leq j \leq N-1$, and comprises:

a first adder stage which receives said sequence $(x_j)$, $0 \leq j \leq N-1$, and supplies a first sequence $(x_j^0)$, $0 \leq j \leq (N/2)-1$, in which $x_j^0 = x_j + x_{N-1-j}$, and a second sequence $(y_j)$, $0 \leq j \leq (N/2)-1$, in which $y_j = x_j - x_{N-1-j}$;

a group of upper half-stages connected in series, a first upper half-stage connected to the first adder stage and receiving the first sequence $(x_j^0)$, $0 \leq j \leq (N/2)-1$, and a last upper half-stage supplying a sequence $(X_{2q})$, $0 \leq q \leq (N/2)-1$, of even index components of the cosine transform, a signal supplied on each output of each upper half-stage being obtained by linear combination of at most two signals applied to each of its inputs, said group of upper half-stages being defined by recurrence on the size N and constituting a cosine transform circuit for N/2 points, said group of upper half-stages comprising in series, for N=8, an adder stage, a multiplier stage, an adder stage and a multiplier stage;

a group of lower half-stages connected in series, a first lower half-stage connected to the first adder stage and receiving the second sequence $(y_j)$, $0 \leq j \leq (N/2)-1$, and a final lower half-stage supplying a sequence $(X_{2q+1})$, $0 \leq q \leq (N/2)-1$, of odd index components of the cosine transform, the signal supplied on each output of each lower half-stage being obtained by linear combination of at most two signals applied to each of its inputs, the group of lower half-stages comprising in series:

(a) a first lower adder half-stage supplying a third sequence $(x_j^3)$, $0 \leq j \leq (N/8)-1$, in which $x_j^3 = y_{4j+2} + y_{4j+1}$, a fourth sequence $(x_j^1)$, $0 \leq j \leq (N/4)-1$, in which $x_j^1 = y_{4j}$ for $j \leq (N/8)-1$ and $x_j^1 = -y_{N-4j-1}$ for $j \geq (N/8)-1$, and a fifth sequence $(x_j^2)$, $0 \leq j \leq (N/8)-1$ in which $x_j^2 = y_{4j+2} - y_{4j+1}$, (b) a sequence of lower adder ∠ multiplier half-stages supplying a sixth sequence $(\alpha_{2q+1})$, $0 \leq q \leq (N/8)-1$, equal to the real parts of the odd index components of a Fourier transform of order N/2 of the fourth sequence, a seventh sequence $(\beta_{2q+1})$, $0 \leq q \leq (N/8)-1$ equal to the imaginary parts of the odd index components of the Fourier transform of order N/2 of the fourth sequence, an eighth sequence $(\delta_{2q+1})$, $0 \leq q \leq (N/8)-1$ equal to the odd index components of the sine transform of order N/4 of the fifth sequence, a ninth sequence $(\gamma_{2q+1})$, $0 \leq q \leq (N/8)-1$ equal to the odd index components of the cosine transform of order N/4 of the third sequence, (c) a second lower adder half-stage for supplying the sequences $(\alpha_{2q+1} + \gamma_{2q+1})$, $0 \leq q \leq (N/8)-1$, $(\alpha_{2q+1} - \gamma_{2q+1})$, $0 \leq q \leq (N/8)-1$, $(\beta_{2q+1} + \delta_{2q+1})$, $0 \leq q \leq (N/8)-1$, and $(\beta_{2q+1} - \delta_{2q+1})$, $0 \leq q \leq (N/8)-1$, and (d) a lower multiplier half-stage supplying the sequence $(X_{2q+1})$, $0 \leq q \leq (N/2)-1$, of odd index components of the cosine transform of order N of the sequence $(x_j)$, $0 \leq j \leq N-1$.

2. A circuit according to claim 1, wherein the group of upper half-stages and lower half-stages comprise an identical number of adder half-stages.

3. A circuit according to claim 2, in which in each stage, the upper half-stage and the lower half-stage are the same, i.e. both are adder stages or both are multiplier stages.

4. A circuit according to claim 1, wherein the group of upper half-stages and the group of lower half-stages comprise an identical number of multiplier half-stages, in which the first multiplier half-stage is equal to the identity operation.

5. A circuit according to claim 1, wherein the sequence of lower half-stages supplying the sixth sequence equal to the real parts of the odd index components of the N/2 order Fourier transform (N/2 discretized signal) of the fourth sequence consists of adder and multiplier stages, the number of stages, the number of discrete signals and the stage type are those of a cosine transform circuit for a sequence of N/4 points, said cosine transform circuit comprising in series, for N=4, an adder stage and a multiplier stage.

6. A circuit according to claim 1, wherein each group of half-stages comprises n−2 adder half-stages and E((n+1)/2) multiplier half-stages, in which E is the integral part function, in which the first multiplier half stage is equal to the identity operation.

7. A circuit according to claim 1, said circuit comprising a first memory of at least N storage cells between the first adder stage and the groups of upper and lower half-stages and a second memory of at least N/2 storage cells between each of said upper and lower half stages.

8. A circuit according to claim 7, which also comprises another memory of at least N storage cells in front of the first adder stage.

9. A circuit according to claim 1, said circuit comprising a first double memory which includes a first and a second group of at least N storage cells between the first adder stage and the groups of upper and lower half-stages and a second double memory having a first and a second group of at least N/2 storage cells between each of said upper and lower half-stages.

10. A circuit for the fast calculation of the inverse cosine transform $(x_i)$, $0 \leq i \leq N-1$ of a discretized signal defined by a sequence $(X_i)$, $0 \leq i \leq N-1$, in which $N=2^n$ and n is a number equal to or greater than 4, wherein said circuit comprises a group of upper half-stages receiving a sequence $(X_{2q})$, $0 \leq q \leq (N/2)-1$ of even index components of the cosine transform and supplying a first sequence $(x_j^0)$, $0 \leq j \leq (N/2)-1$, a group of lower half-stages receiving a sequence $(X_{2q+1})$, $0 \leq q \leq (N/2)-1$ of the odd index components of the cosine transform and supplying a second sequence $(x_j^1)$, $0 \leq j \leq (N/2)-1$, and a final adder stage receiving the first sequence $(x_j^0)$ and the second sequence $(x_j^1)$ and supplying a sequence $(x_j)$, $0 \leq j \leq N-1$, each upper half-stage, each lower half-stage and the final adder stage respectively performing the reverse cosine mathematical operation.

11. A circuit according to claim 10, wherein said circuit comprises a first memory of at least N storage cells between the adder stage and the groups of upper and lower half stages and a second memory of at least N/2 storage cells between each of said upper and lower half stages.

12. A circuit according to claim 10, wherein said circuit comprises a first double memory having two series of at least N storage cells between the adder stage and the groups of upper and lower half stages and a second double memory having two series of at least N/2 storage cells between each of said upper and lower half stages.

13. A circuit according to claim 11, wherein said circuit comprises another memory with at least N storage cells in front of the adder stage.

* * * * *